United States Patent
Venkob et al.

(10) Patent No.: US 9,515,771 B2
(45) Date of Patent: Dec. 6, 2016

(54) METHODS AND SYSTEMS FOR THE ALLOCATION OF MEASUREMENT GAPS IN A CARRIER AGGREGATION ENVIRONMENT

(71) Applicant: BlackBerry Limited, Waterloo (CA)

(72) Inventors: Satish Venkob, Waterloo (CA); Claude Jean-Frederic Arzelier, Cannes (FR); Takashi Suzuki, Ichikawa (JP); Xusheng Wei, Staines (GB)

(73) Assignee: BlackBerry Limited, Waterloo, CA (US)

( * ) Notice: Subject to any disclaimer, the term of this patent is extended or adjusted under 35 U.S.C. 154(b) by 0 days.

(21) Appl. No.: 14/271,718

(22) Filed: May 7, 2014

(65) Prior Publication Data

US 2014/0341192 A1    Nov. 20, 2014

(51) Int. Cl.
*H04W 24/00* (2009.01)
*H04W 72/04* (2009.01)
*H04L 1/00* (2006.01)
*H04L 5/00* (2006.01)
(Continued)

(52) U.S. Cl.
CPC ............... *H04L 1/00* (2013.01); *H04L 5/001* (2013.01); *H04W 24/00* (2013.01); *H04W 52/0216* (2013.01); *H04W 52/0229* (2013.01); *H04W 72/12* (2013.01)

(58) Field of Classification Search
None
See application file for complete search history.

(56) References Cited

U.S. PATENT DOCUMENTS

2011/0274007 A1* 11/2011 Lin .................. H04W 36/0094
370/254

2012/0113866 A1* 5/2012 Tenny .................. H04W 24/10
370/254

(Continued)

FOREIGN PATENT DOCUMENTS

EP        2385723 A1    11/2011
EP        2579668 A1 *   4/2013

(Continued)

OTHER PUBLICATIONS

3GPP TS 36.331, "Evolved Universal Terrestrial Radio Access (E-UTRA); Radio Resource Control (RRC); Protocol Specification," Release 8, V8.18.0, Dec. 2012.

(Continued)

*Primary Examiner* — Omar Ghowrwal
(74) *Attorney, Agent, or Firm* — Moffat & Co.

(57) ABSTRACT

A method, network element and user equipment, where in one embodiment at a network element, allocating a measurement gap configuration for a user equipment (UE) capable of operating in a carrier aggregation environment using at least first and second component carriers; and sending the measurement gap allocation to the UE, the allocation indicating a first measurement gap configuration for the first component carrier, the first measurement gap configuration being different than a second measurement gap configuration allocated for the second component carrier. In another embodiment at a UE capable of operating in a carrier aggregation environment using at least first and second component carriers, sending a measurement gap preference to a network, the preference including preference information indicating a preference for a first measurement gap configuration for the first component carrier, the first measurement gap configuration being different than a second measurement gap configuration for the second component carrier.

16 Claims, 7 Drawing Sheets

(51) Int. Cl.
*H04W 52/02* (2009.01)
*H04W 72/12* (2009.01)

(56) References Cited

U.S. PATENT DOCUMENTS

| | | | | |
|---|---|---|---|---|
| 2012/0252487 A1* | 10/2012 | Siomina | ............... | H04W 24/10 455/456.1 |
| 2013/0107743 A1* | 5/2013 | Ishii | ........................ | H04L 5/001 370/252 |
| 2013/0343252 A1* | 12/2013 | Chakraborty | ..... | H04W 52/0261 370/311 |
| 2014/0056395 A1* | 2/2014 | Alriksson | ............ | H03G 3/3073 375/345 |

FOREIGN PATENT DOCUMENTS

| | | | | |
|---|---|---|---|---|
| EP | 2629566 A1 | 8/2013 | | |
| EP | 2938012 | 10/2015 | | |
| GB | 2490661 A | * 11/2012 | ............. | H04L 5/001 |
| WO | 2012092792 A1 | 7/2012 | | |

OTHER PUBLICATIONS

3GPP TS 36.306, "Evolved Universal Terrestrial Radio Access (E-UTRA); User Equipment (UE) radio access capabilities," Release 8, V8.7.0, Jun. 2010.
Qualcomm Incorporated, 3GPP TSG-RAN WG2 #71 R2-106284, Nov. 15-16, 2010, Jacksonville, Florida, USA, "Indication of need for measurement gaps in carrier aggregation."
Huawei, 3GPP-TSG-RAN WG2 Meeting #70bis R2-103948, Jun. 28-Jul. 2, 2010, Stockholm, Sweden, "Reciever Impact on Measurement."
Huawei, HiSilicon, 3GPP TSG-RAN WG2 Meeting #72bis R2-110111, Jan. 17-21, 2011, Dublin, Ireland, "Measurement Gap in Rel-10."
3GPP TS 36.331, "Evolved Universal Terrestrial Radio Access (E-UTRA); Radio Resource Control (RRC); Protocol Specification," Release 11, V11.2.0, Dec. 2012.
Nokia Siemens Networks, 3GPP TSG-RAN WG2 Meeting #76 R2-116444, Nov. 14-18, 2011, San Francisco, USA, "Introduction of the procedural rules for the frequency specific compressed mode".
Nokia Siemens Networks, 3GPP TSG-RAN WG2 Meeting #74 R2-116444, May 9-13, 2011, Barcelona, Spain "Introduction of the frequency specific compressed mode".
3GPP TS 36.133, "LTE; Evolved Universal Terrestrial Radio Access (E-UTRA); Requirements for support of radio resource management," Release 10, V10.1.0, Jan. 2011.
3GPP TS 36.331, "LTE; Evolved Universal Terrestrial Radio Access (E-UTRA); Radio Resource Control (RRC); Protocol specification," Release 10, V10.7.0, Nov. 2012.
3GPP TR 36.913, "Requirements for Further Advancements for E-UTRA (LTE-Advanced)" Release 11, V11.0.0 Nov. 2012.
3GPP TS 36.300 "Evolved Universal Terrestrial Radio Access (E-UTRA) and Evolved Universal Terrestrial Radio Access Network (E-UTRAN); Stage 2" Release 10, V10.5.0, Nov. 2011.
3GPP TS 36.300 "Evolved Universal Terrestrial Radio Access (E-UTRA) and Evolved Universal Terrestrial Radio Access Network (E-UTRAN); Stage 2" Release 11, V11.3.0, Nov. 2012.
World Intellectual Property Organization, International Preliminary Report on Patentability on PCT Application No. PCT/IB2013/001249, Issued on Nov. 17, 2015.
World Intellectual Property Organization, Written Opinion of the International Search Authority on PCT Application No. PCT/IB2013/001249, Issued on Nov. 15, 2015.
World Intellectual Property Organization, International Search Report on PCT Application No. PCT/IB20131001249, Issued on Nov. 20, 2015.
Samsung: "Initial overview on new carrier", 3GPP Draft; R2-122887, 3rd Generation Partnership Project (3GPP), Mobile Competence Centre ; 650, Route Des Lucioles ; F-06921 Sophia-Antipolis Cedex ; France, vol. RAN WG2, no. Prague, Czech Republic; 20120521-20120525, XP050607451, May 15, 2012.
LG Electronics Inc: "Linking for Msg4", 3GPP Draft; R2-103930 LTE CA MSG4, 3rd Generation Partnership Project (3GPP), Mobile Competence Centre; 650, Route Des Lucioles; F-06921 Sophia-Antipolis Cedex; France, vol. RAN WG2, no. Stockholm, Sweden; 20100628, XP050451296, Jun. 22, 2010, XP050451296.
NTT Docomo et al: "Measurement gap control in CA", 3GPP Draft; R2-101547 CA Measgap Control, 3rd Generation Partnership Project (3GPP), Mobile Competence Centre; 650, Route Des Lucioles; F-06921 Sophia-Antipolis Cedex; France, vol. RAN WG2, no. San Francisco, USA; 20100222, KP050421887, Feb. 16, 2010.
European Patent Office, Office Action for Application No. 13744782.7, issued on Sep. 30, 2016.

* cited by examiner

METHODS AND SYSTEMS FOR THE ALLOCATION OF MEASUREMENT GAPS IN A CARRIER AGGREGATION ENVIRONMENT

FIELD OF THE DISCLOSURE

The present disclosure relates to wireless networks, and in particular to measurement gap configuration for a user equipment (UE) operating in a carrier aggregation environment.

BACKGROUND

Data enabled mobile devices, such as smartphones, have become widely adopted, and applications and data requirements for such data enabled mobile devices have increased. As multimedia and data rich applications have become more prevalent, increased data throughput to and from a data enabled mobile device is needed. In response, newer wireless networks contemplate higher data throughput rates. For example, in a Long Term Evolution-Advanced (LTE-A) system, peak target data rates are 1 Gbps and 500 Mbps for downlink and uplink respectively. To achieve such target data rates, one potential approach is to use carrier aggregation techniques that utilize bandwidth aggregation of a variety of different arrangements of component carriers (CCs), including the same or different bandwidths, adjacent or non-adjacent CCs in the same frequency band or different frequency bands.

In the Third Generation Partnership Project (3GPP), Long Term Evolution-Advanced (LTE-A), carrier aggregation was introduced in Release 10. With carrier aggregation, multiple component carriers may be allocated for both downlink and/or uplink transmissions.

In addition, from Long-Term Evolution (LTE) Standard Release 8 onwards, a UE is typically required to perform radio measurements of neighbouring cells, for example for handover purposes, etc. During normal data communications, the UE is typically camped on a frequency and Radio Access Technology (RAT) of its serving cell. However, radio measurements are usually also performed on one or more different frequencies (inter-frequency) and/or different RATs (inter-RAT) than the frequency and/or RAT of its serving cell. Inter-frequency measurements are performed between the channels of different frequencies within the same or a different LTE band. Inter-RAT measurements are performed between the channels of different Radio Access Technologies (e.g. GSM, UMTS, LTE).

A UE having a single transceiver is typically unable to simultaneously receive/send data on one frequency and perform measurements on another frequency. Thus the UE switches to another frequency or frequency band to perform measurements. One way to address such measurements is by having a base station schedule "measurement gaps" (e.g. time slots) between the data communications of the UE with the network (see e.g. 3GPP TS 36.331 v8.18.0 *"Evolved Universal Terrestrial Radio Access (E-UTRA); Radio Resource Control (RRC); Protocol specification (Release 8)"*, December 2012, and 3GPP TS 36.306 v8.7.0 *"Evolved Universal Terrestrial Radio Access (E-UTRA); User Equipment (UE) radio access capabilities (Release 8)"*, June 2010, the contents of which are both incorporated herein by reference). During these gaps, a UE may switch to another frequency or RAT and perform measurements. Once the measurement gap has elapsed, data communications with the network may resume. In UMTS, a similar approach is referred to as "compressed mode".

BRIEF DESCRIPTION OF THE DRAWINGS

The present disclosure will be better understood with reference to the drawings, in which.

DETAILED DESCRIPTION OF THE DRAWINGS

Figure 1:
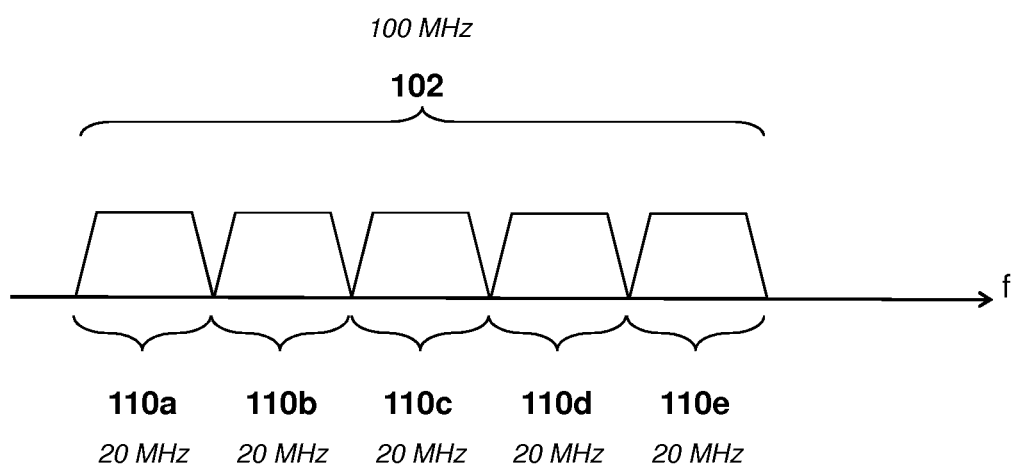
FIG. 1 is a diagram showing an intra-frequency, contiguous arrangement of component carriers in carrier aggregation.

The present disclosure provides a method at a user equipment (UE) capable of operating in a carrier aggregation environment using at least first and second component carriers, the method comprising: receiving at the UE a measurement gap allocation from a network, the allocation indicating a first measurement gap configuration for the first component carrier of the UE, the first measurement gap configuration being different than a second measurement gap configuration for the second component carrier of the UE; and implementing the first measurement gap configuration for the first component carrier and the second measurement gap configuration for the second component carrier simultaneously at the UE.

The present disclosure further provides a user equipment (UE) capable of operating in a carrier aggregation environment using at least first and second component carriers, the user equipment comprising: a processor; and a communications subsystem, wherein the user equipment is configured to: receive at the UE a measurement gap allocation from a network, the allocation indicating a first measurement gap configuration for the first component carrier of the UE, the first measurement gap configuration being different than a second measurement gap configuration for the second component carrier of the UE; and implement the first measurement gap configuration for the first component carrier and the second measurement gap configuration for the second component carrier simultaneously.

The present disclosure further provides a method in a user equipment (UE) capable of operating in a carrier aggregation environment using at least first and second component carriers, the method comprising: sending a measurement gap preference to a network, the preference including preference information indicating a preference for a first measurement gap configuration for the first component carrier, the first measurement gap configuration being different than a second measurement gap configuration for the second component carrier.

The present disclosure further provides a user equipment (UE) capable of operating in a carrier aggregation environment using at least first and second component carriers, the user equipment comprising: a processor; and a communications subsystem, wherein the user equipment is configured to: send a measurement gap preference to a network, the preference including preference information indicating a preference for a first measurement gap configuration for the first component carrier, the first measurement gap configuration being different than a second measurement gap configuration for the second component carrier.

The present disclosure further provides a method at a network element, comprising: allocating a measurement gap configuration for a user equipment (UE) capable of operating in a carrier aggregation environment using at least first and second component carriers; and sending the measurement gap allocation to the UE, the allocation indicating a first measurement gap configuration for the first component carrier, the first measurement gap configuration being different than a second measurement gap configuration allocated for the second component carrier.

The present disclosure further provides a network element comprising: a processor; and a communications subsystem, wherein the network element is configured to: allocate a measurement gap configuration for a user equipment (UE) capable of operating in a carrier aggregation environment using at least first and second component carriers; and send the measurement gap allocation to the UE, the allocation indicating a first measurement gap configuration for the first component carrier, the first measurement gap configuration being different than a second measurement gap configuration allocated for the second component carrier.

The present disclosure is described with reference to 3GPP LTE-A. However, the present disclosure is not limited to this technology and other technologies may utilize the teachings provided herein. These may include but are not limited to 3GPP UTRAN, 3GPP GERAN/EDGE/GSM, CDMA2000, IEEE, and 802.11x IEEE, WIMAX. Thus the reference to LTE-A herein is therefore merely used as an example. In addition, the present disclosure is described with reference to a User Equipment "UE". However, the present disclosure applies to any suitable device and any other suitable terminology may be used, including but not limited to a device handset, a mobile device, a Mobile equipment (ME), and a Mobile Station (MS).

Carrier Aggregation

To fulfil the 3GPP LTE-Advanced requirements on capacity and spectrum efficiency as specified in the 3GPP Technical Report, TR 36.913 *"Requirements for Further Advancements for E-UTRA (LTE-Advanced)"*, LTE-A needs to support wider transmission bandwidths than the currently supported 20 MHz bandwidth specified in Releases 8 and 9 while also maintaining backwards compatibility with Releases 8 and 9.

Therefore, the 3GPP Work Item 460007 *"Carrier Aggregation for LTE" [Rel-10]* provides for multiple component carriers (up to 5) to be aggregated to form a larger overall transmission bandwidth up to 100 MHz.

In carrier aggregation, a single "serving cell" used for transmission between a UE and a network is replaced with a plurality of serving cells. In 3GPP terminology, these plurality of serving cells comprise a primary serving cell (PCell) and one or more secondary serving cells (SCells).

In carrier aggregation, multiple component carriers (CCs) can be allocated in a subframe to a UE. Multiple CCs may be from the same evolved Node B (eNB) or from different eNBs. Thus, each component carrier may have a bandwidth of, for example, 20 MHz and a total aggregated system bandwidth could reach 100 MHz when five component carriers are aggregated. FIG. 1 shows an example of this wherein component carriers 110a to 110e are in the same frequency band (intra-frequency) and are adjacent to once another (contiguous). Each of component carriers 110a to 110e may have a width of 20 MHz and the thus the total system bandwidth 102 is 100 MHz.

The UE may receive or transmit on multiple component carriers depending on the capabilities of the UE. The component carriers may be contiguous or non-contiguous. Furthermore, the carriers could be aggregated intra-band or inter-band. This means that carrier aggregation may occur with carriers located in the same E-UTRA operating frequency band as the primary carrier or outside of that frequency band. For example, one carrier may be located at 2 GHz band and a second aggregated carrier may be located at 800 MHz band.

Figure 2A:
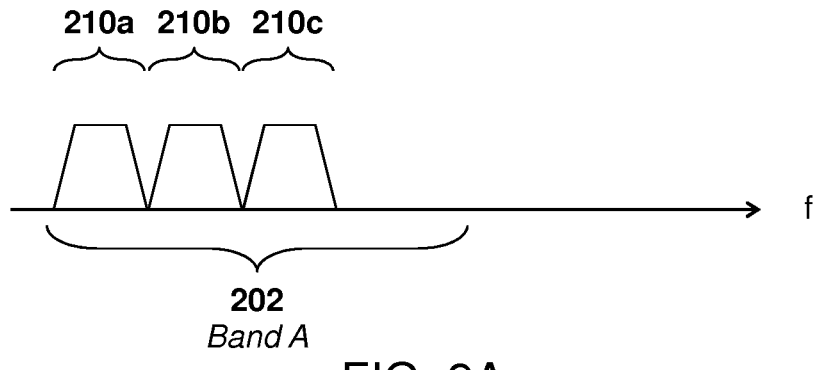
FIG. 2A is a diagram showing another intra-frequency, contiguous arrangement of component carriers in carrier aggregation.
Figure 2B:
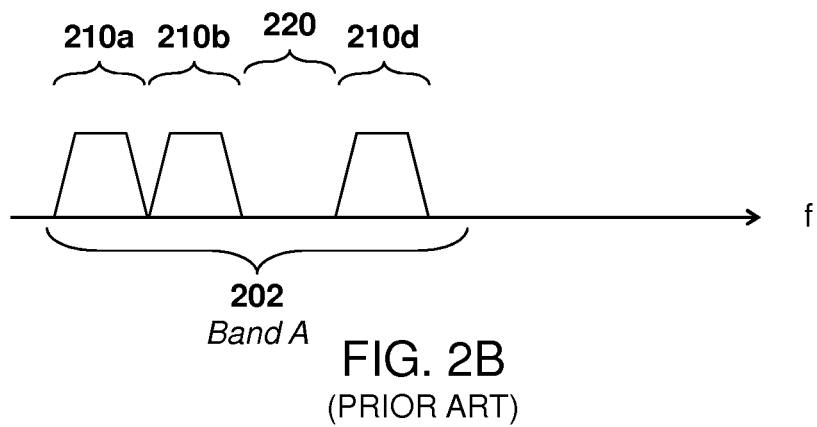
FIG. 2B is a diagram showing an intra-frequency, non-contiguous arrangement of component carriers in carrier aggregation.
Figure 2C:
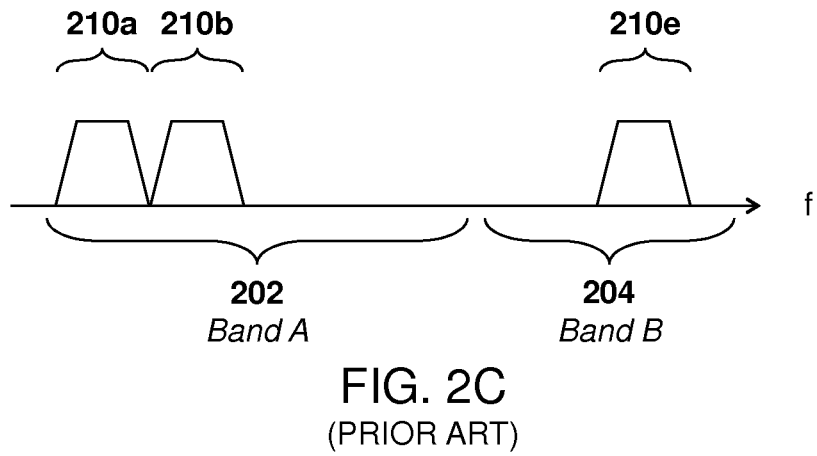
FIG. 2C is a diagram showing an inter-frequency arrangement of component carriers in carrier aggregation.

FIGS. 2A to 2C show some various possible ways of arranging the aggregation. FIG. 2A shows an intra-band contiguous arrangement in which component carriers 210a, 210b and 210c are contiguous and located within the same operating frequency band 202 (Band A). FIG. 2B shows an intra-band non-contiguous arrangement in which at least two component carriers 210b and 210d are separated by a frequency gap 220 within the same operating frequency band 202 (Band A). FIG. 2C shows an inter-band arrangement where component carriers 210a and 210b are located in frequency band 202 (Band A) while carrier 210e is located in band 204 (Band B).

In a Carrier Aggregation system, the number of CCs aggregated in the downlink may be different than the number in the uplink. In addition, for a frequency division duplex (FDD) Carrier Aggregation system, the bandwidths of each Component Carrier configured for the uplink may be different from those for the downlink.

A primary cell (PCell) or another scheduling cell may schedule a UE to listen to the physical downlink shared channel (PDSCH) of a scheduled secondary cell (SCell). The scheduling may be done through the use of a physical downlink control channel (PDCCH) at the primary cell or another scheduling cell. Examples of such carrier aggregation are, for example, defined by the Third Generation Partnership Project (3GPP) Long Term Evolution-Advanced (LTE-A) Technical Specification (TS) 36.300, *"Evolved Universal Terrestrial Radio Access (E-UTRA) and Evolved Universal Terrestrial Radio Access Network (E-UTRAN); Overall description; Stage 2"*, v.11.3.0, Sep. 26, 2012, the contents of which are incorporated herein by reference.

In carrier aggregation, each UE only has one radio resource control (RRC) connection with the network. The serving cell that handles the RRC connect establishment or re-establishment or handover is the primary cell (PCell). The carrier corresponding to the PCell in the downlink is termed the downlink primary component carrier (DL-PCC), while in the uplink is termed the uplink primary component carrier (UL-PCC).

Other serving cells are the secondary cells (SCells) and their corresponding carriers are referred to as secondary component carriers (SCC).

Thus, for a UE, the configured set of serving cells consists of one primary cell and one or more secondary cells.

The architecture or layout of the primary cells and secondary cells may vary depending on the deployment scenario. For example, various deployment scenarios are shown in Table J.1-1 of 3GPP TS 36.300, v10.5.0 *"Evolved Universal Terrestrial Radio Access (E-UTRA) and Evolved Universal Terrestrial Radio Access Network (E-UTRAN); Overall description; Stage 2 (Release 10)"*, September 2011, the entire contents of which are incorporated herein by reference. As shown in Table J.1-1, various deployment scenarios include co-located and overlaid cells providing nearly the same coverage. In this case, the cells may be within the same operating band and aggregation may be possible between the overlaid cells.

In a second deployment scenario, the cells may be co-located and overlaid, but one group of cells may have a smaller coverage area due to a larger path loss. In this case, the cells with a smaller coverage may be used to improve throughput and the cells may be in different bands.

In the third deployment scenario, the cells may be co-located but one group of cells may be at the cell boundary of the other group of cells so that cell edge throughput is increased.

In a fourth deployment scenario, the first group of cells may provide macro coverage and the second group of cells may be remote radio heads (RRHs) and are used to improve throughput at hot spots.

In a fifth deployment scenario, the cells may be overlaid but frequency selective repeaters may be deployed to extend coverage for one of the carrier frequencies.

The above scenarios are only examples and are not meant to be limiting.

Measurement Gaps

As described above, a UE having a single transceiver is typically not able to simultaneously communicate on the frequency of its serving cell and also perform measurements in a different frequency band and/or on a different RAT. In LTE, a network may therefore configure measurement gaps for the UE in which no uplink or downlink data communications are scheduled, thereby providing the UE with timeslots (e.g. gaps) in which it can perform measurements. There may also be situations when the network does not schedule any measurement gaps for the UE.

Figure 3:
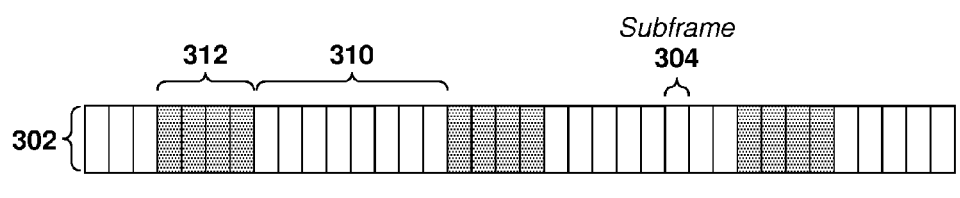
FIG. 3 is a diagram showing transmissions with measurement gaps on a single carrier at a UE.

An example of measurement gaps in UE communications is shown in FIG. 3. This block diagram may represent LTE subframe communications on a serving frequency or carrier 302 at a UE. Each sub-block 304 may represent an LTE subframe. Measurement gaps 312 are scheduled between possible uplink/downlink data communications 310 with the network.

It is to be appreciated however that each sub-block 304 could represent a different subdivision of time other than an LTE subframe. Furthermore, the duration of each 'data' and 'gap' period in terms of number of blocks (e.g. subframes) shown in the Figures is used for illustrative and descriptive purposes only and is thus not meant to be limiting.

The duration and frequency of the gaps may form part of what is called a measurement gap "pattern". LTE Release 8 defines two measurement gap patterns: gap pattern 0 having a measurement gap repetition period (MGRP) of 40 ms and gap pattern 1 having a repetition period of 80 ms. Thus according to these patterns, measurement gaps are scheduled for a UE either every 40 ms or 80 ms. In addition, both defined patterns have measurement gap lengths (MGL) of 6 ms. Thus a UE typically has 6 ms window in which to perform measurements before it is scheduled to return to data communications with the network.

Modifying one or both of a MGRP and a MGL results in a different measurement gap pattern. A measurement gap "configuration" may include a gap pattern as well as some other parameters, such as gap offset, etc.

As an LTE subframe has a duration of 1 ms, the MGL is equal to 6 subframes and the MGRPs of gap patterns 0 and 1 are equal to 40 and 80 subframes, respectively.

According to subclause 6.3.5 of 3GPP TS 36.331 v11.2.0 *"Evolved Universal Terrestrial Radio Access (E-UTRA); Radio Resource Control (RRC); Protocol specification (Release 11)"*, December 2012, only a single measurement gap configuration is provided for a UE even when the UE is assigned two or more component carriers (e.g. carrier aggregation). A portion of subclause 6.3.5 is reproduced in Table 1 below.

TABLE 1

MeasGapConfig Information Element

```
MeasGapConfig information element
-- ASN1START
MeasGapConfig ::=          CHOICE {
    release                    NULL,
    setup                      SEQUENCE {
        gapOffset                  CHOICE {
            gp0                        INTEGER (0..39),
            gp1                        INTEGER (0..79),
            ...
        }
    }
}
-- ASN1STOP
            MeasGapConfig field descriptions
gapOffset
Value gapOffset of gp0 corresponds to gap offset of Gap Pattern Id "0"
with MGRP = 40 ms, gapOffset of gp1 corresponds to gap offset of Gap
Pattern Id "1" with MGRP = 80 ms. Also used to specify the
measurement gap pattern to be applied, as defined in TS 36.133.
```

The result is that when measurement gaps are configured for a UE, the same measurement gap configuration or pattern (pattern 0, gp0 or pattern 1, gp1) is applied across all of the component carriers of the UE. Measurement gaps are not always needed on all component carriers at the same time. Furthermore, it is not always suitable to apply the same gap configuration on all of the component carriers.

Figure 4:
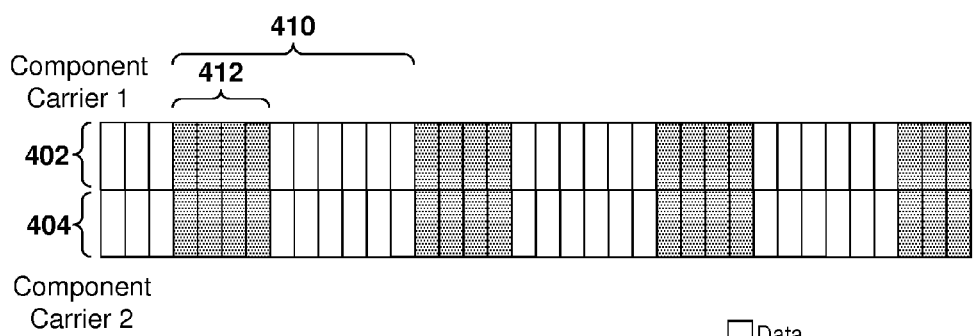
FIG. 4 is a diagram showing transmissions with measurement gaps on two component carriers at a UE.

Such a situation is shown in FIG. 4, which represents LTE-A subframe communications at a UE on two component carriers 402 and 404. Gaps 412 having the same lengths (MGLs) and the same repetition periods (MGRPs) 410 are scheduled at the same times for each of component carriers 402 and 404.

Although the above measurement gap configuration in carrier aggregation allows a UE to perform measurements between data communications with the network, the application of the same gap pattern across all component carriers is not always optimal or desired.

For example, measurement gaps are not always needed on all component carriers at the same time. Furthermore, it is not always efficient to apply the same gap pattern on all of the component carriers.

The inflexibility of this approach to configuring measurement gaps across multiple component carriers can result in some inefficiencies. Some of these inefficiencies are explained below with reference to some example scenarios.

In order to implement carrier aggregation, a UE may comprise two or more receivers and/or transmitters. Table 2 shows the supported frequency bands of an example transceiver radio frequency (RF) chain architecture comprising two transceivers Rx1/Tx1 and Rx2/Tx2. It is to be appreciated however that a UE may comprise more than two receivers and/or transmitters chains. A UE may also support fewer or more frequency bands than those shown in Table 2. The configuration represented in Table 2 is provided only as an example and is not meant to be limiting.

TABLE 2

Example UE Tranceiver Configuration

|  | Rx1/Tx1 | Rx2/Tx2 |
|---|---|---|
| Supported Bands | Band A<br>Band B<br>Band C | Band C<br>Band D<br>Band E |

In carrier aggregation, multiple component carriers are assigned to the UE by the network. Carriers from different bands or the same band are allocated based on the support or capability indicated by the UE to the network.

In the present example, Rx1/Tx1 chain supports Bands A, B and C, whereas Rx2/Tx2 supports Bands C, D and E. The UE indicates which band combinations it supports for Carrier Aggregation (together with associated bandwidth information support for each band). The network then assigns the UE multiple component carriers in one or more frequency bands to be used for communication with the network. For example, the UE could be told to communicate on component carrier (frequency) A in Band A and on component carrier (frequency) D in Band D. Rx1/Tx1 would thus commutate over component carrier A in Band A and Rx2/Tx2 would communicate over component carrier D in Band D.

In a first scenario, the UE needs to perform measurements on target Band C. Because the UE is communicating on Bands A and D, a measurement gap is needed on at least one of Rx1/Tx1 and Rx2/Tx2 in order to perform measurements on Band C. However, according to current LTE specifications, a measurement gap configuration for the above example would look similar to the configuration shown in FIG. 4, wherein the same gap pattern is applied for both component carriers on Bands A and D, respectively. Thus communications on Bands A and D are simultaneously suspended during each measurement gap. However, in order for the UE to perform measurements on Band C, only one of the transceivers needs to suspend its data communications with the network. Thus a measurement gap is scheduled for one of transceivers Rx1/Tx1 and Rx2/Tx2 unnecessarily. An unnecessary measurement gap may result in decreased throughput as the UE is prevented from exchanging data with the network.

Thus in accordance with some of the embodiments described herein, the UE would be permitted to perform measurements using one transceiver and simultaneously perform data communications with the network using the other transceiver.

In a second scenario, the UE needs to perform measurements on target Band B. Since only Rx1/Tx1 supports Band B, a measurement gap will be needed on the component carrier in Band A. However, according to current LTE-A specifications, one or more measurement gaps will be allocated for the component carriers in both frequency bands A and D simultaneously.

The suspension of communications with the network over Rx2/Tx2 is unnecessary since the measurements are being performed using Rx1/Tx1. In addition, Rx2/Tx2 does not even support Band B. Thus scheduling a measurement gap in communications over Rx2/Tx2 for the purposes of the UE performing measurements on Band B is useless. Rx2/Tx2 would be unable to perform measurements on Band B in any event.

The insertion of a measurement gap into the data communications of a UE over a component carrier can have a negative impact on system performance as data communications between the UE and network are temporarily suspended. Undesirable consequences resulting from the scheduling of measurement gaps may include a reduction in throughput of the system, increased system latency, increased interference, and increased power consumption by the UE. For example, during a measurement gap, a transceiver is temporarily unable to perform data communications with the network, resulting in a decreased throughput. Reduced throughput and/or increased latency can negatively affect quality of service of certain applications, especially for some real time services.

Further, increased latency caused by measurement gaps may also cause the UE to produce additional interference to other UEs as the UE may increase its power in order to increase its data rate in an attempt to compensate for the period of no data communications during one or more measurement gaps.

On the other hand, not allocating measurement gaps when they could be allocated may necessitate a UE having additional parallel receiver/transmitter chains in order to accommodate some or all of the component carriers independently or their combinations. For example, when no gaps are scheduled for a UE, one or more additional transceivers may be desirable or necessary to allow the UE to perform measurements on these additional transceivers while the UE performs data transmissions on the other transceiver(s). This may result in more expensive UEs due to additional components, and may also result in increased battery consumption by the UE as additional hardware chains and associated hardware components can draw additional power.

Therefore applying a single measurement gap pattern across all of the component carriers of a UE may result in measurement gaps being scheduled for a particular component carrier too frequently or too infrequently than required or wanted. In addition, the length of the measurement gaps may be too short or too long for the particular component carrier. Whether one gap configuration may be more suitable than another gap configuration may depend on one or more factors or considerations, such as a physical location of a UE relative to a base station(s), current radio conditions, interference from other UEs and/or devices, propagation environments, etc.

As described above, the use of measurement gaps is typically required in order for a UE to perform measurements on different frequency bands and/or RATs. Thus due to the possible undesirable consequences of employing measurement gaps, a degree of flexibility in configuring measurement gaps for a UE operating in an aggregated carrier mode is provided herein. Allowing for a degree of flexibility in scheduling measurement gaps across two or more component carriers of a UE can in some situations reduce at least some of the limitations described above.

In considering introducing additional flexibility in the configuration of measurement gaps for a carrier aggregation UE, one or more factors may be taken into consideration. Such factors may include system throughput, which can be a key performance metric for physical layer and signalling layer design of a wireless communication system. Other factors can include UE complexity and/or cost, as well as and UE power consumption.

According to the present disclosure, such flexibility is introduced in one or more ways, including by allowing for more than one measurement gap configuration or pattern to be applied simultaneously for a single UE. In other words, different measurement gap configurations may be applied to different component carriers of the UE.

As previously described, according to current LTE-A standards, when a measurement gap configuration is allocated for a UE, a single gap pattern is applied to all of the component carriers assigned to the UE. Different measurement gaps cannot be scheduled on a per-component carrier basis. Either a single measurement gap pattern is applied to all component carriers of the UE or alternatively no measurement gaps are applied to any of the component carriers.

Thus the approach according to current LTE/LTE-A standards for configuring measurement gaps for a carrier aggregation UE lacks flexibility.

Accordingly, the present disclosure provides solutions providing greater flexibility in allocating measurement gaps for a UE in a carrier aggregation environment. In at least some embodiments, this improved flexibility allows for an increase in system performance, including throughput between a UE and a network. The following scenarios illustrate how a greater degree of flexibility may result in improved performance.

In a first scenario, there may be a difference in the relative importance of the different serving cells of the UE. For example, one of the serving frequencies may be more important to the UE and/or the network than one or more other serving frequencies. Hence it may be desirable to avoid or minimize interruptions on this more important serving frequency. For example, in an inter-frequency carrier aggregation scenario, when a UE is required to perform measurements in a different frequency band, it may be desirable to avoid interruptions on the serving frequency corresponding to the Primary Serving Cell (PCell) of the UE. Reasons for this may include that some signalling and other communications are done via the PCell only. Thus it may be desirable to minimize interruptions on a carrier associated with the PCell. For example, the RRC Connection is maintained by the PCell. In addition, non-access stratum (NAS) information also goes through the PCell. Furthermore, some specific channels such as the Physical Uplink Control Channel (PUCCH) also communicate through the PCell. Accordingly, in some situations measurement gaps may be scheduled on one or more component carriers corresponding to one or more Secondary Serving Cells (SCells) rather than on the component carrier corresponding to the PCell. In other situations, gaps may be scheduled less frequently for the carrier associated with the PCell compared to the gaps scheduled for the carrier(s) associated with the SCell(s). Other configurations of gaps on multiple carriers based on a relative importance of the carriers are also possible.

In a second scenario, the different serving cells of a UE may have different loading or load factors, meaning how busy the cells are. Further, perhaps one or more bands or band combinations are lesser used than other bands or band combinations. Therefore load factors of one or more of the serving cells may be considered when a measurement gap configuration is allocated for the UE. For example, one option may be to avoid or minimize the number of interruptions on a serving frequency corresponding to a heavily loaded serving cell.

In a third scenario, a UE may experience different radio conditions with its serving cells. Thus radio conditions between the UE and one or more of its serving cells may be considered when configuring measurement gaps for the UE. Radio conditions can include propagation conditions, signal interference, signal power, etc.

Therefore as illustrated by the above example scenarios, one or more embodiments of the present disclosure provide for the ability to schedule measurement gaps for certain component carriers of a UE and not for others. In addition, one or more embodiments of the present disclosure provide for the ability to allocate different measurement gap configurations or patterns for different component carriers. One or both of these options may allow for an enhancement in the performance of a wireless network.

The present disclosure provides several solutions. Although these solutions are described having reference to a UE communicating on two component carrier frequencies, this is not intended to be limiting. One or more of the solutions may be implemented with respect to a UE utilizing more than two component carrier frequencies.

Alternate Measurement Gaps

According to one aspect of the present disclosure, measurement gaps may be scheduled for a carrier aggregation UE in a time alternating manner. For descriptive purposes only, this aspect is herein referred to the "alternate gaps approach".

In general terms and in at least one embodiment, alternate measurement gaps means that gaps of a first component carrier are repeatedly and regularly interspaced so that they do not occur when gaps of a second component carrier do not occur. In other words, the "alternate" measurement gaps are such that gaps for a first carrier do not overlap in time with gaps for a second carrier.

Figure 5A:
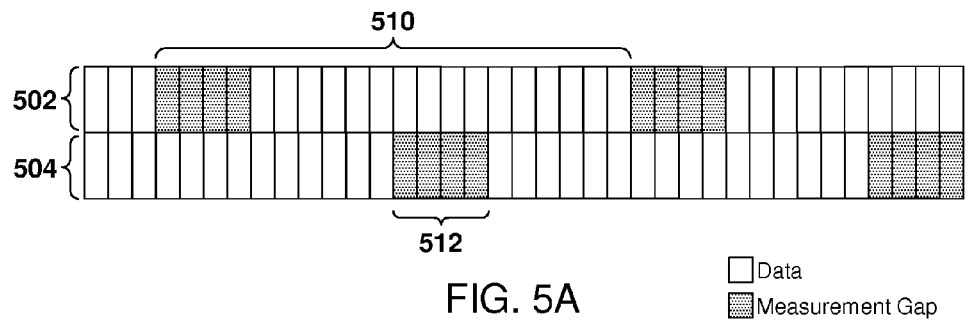
FIG. 5A is a diagram showing transmissions with alternate measurement gaps on two component carriers at a UE.

In at least one embodiment, rather than measurement gaps being scheduled simultaneously on two serving frequencies of a UE (e.g. as in FIG. 4), the gaps may be scheduled at alternating times as between the two serving frequencies. An example of this is shown in FIG. 5A, which represents LTE subframe communications at a UE on two component carriers 502 and 504. Here, the measurement gaps for carriers 502 and 504 are scheduled at different times so that they are staggered in time. The gaps for carriers 502 and 504 also do not overlap, but this is not required in all embodiments. In contrast to the situation shown in FIG. 4, according to the gap configuration shown in FIG. 5A, it is possible for the UE to perform data communications on at least one of the serving frequencies at any given point in time. In other words, in at least one embodiment, measurement gaps are never scheduled simultaneously on all component carriers. In an example where a UE utilizes two component carriers, this means that gaps for a first carrier never overlap in time with gaps for a second carrier.

Figure 5B:
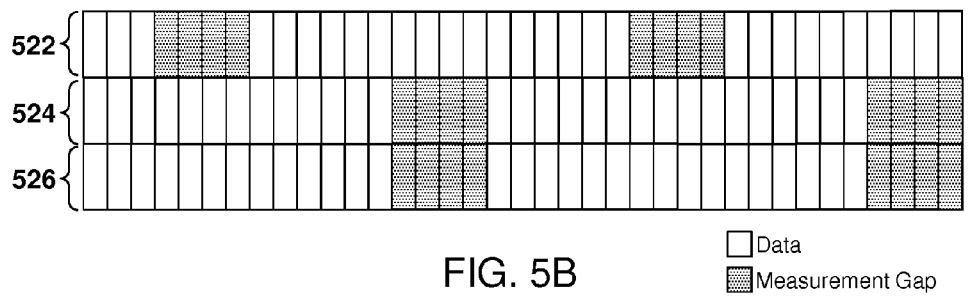
FIG. 5B is a diagram showing transmissions with alternate measurement gaps on three component carriers at a UE.

The alternate gaps approach may also be applied to a UE utilizing more than two component carriers. An example is shown in FIG. 5B, which represents LTE subframe communications at a UE on three component carriers 522, 524 and 526. Here, measurement gaps for carrier 522 are configured to alternate relative to gaps for carriers 524 and 526. In another example described having reference to FIG. 5B but not shown, gaps for each of carriers 522, 524 and 526 may be configured to alternate relative to each other, meaning that gaps for one carrier never overlap with the gaps of the other carriers. Thus in this example, the gaps for all three carriers alternate relative to one another. However the above configurations are only examples. The alternate gaps approach may be implemented for a UE utilizing three or more component carriers in other ways.

In addition, in at least one embodiment, the measurement gap repetition period (MG RP) of alternating measurement gaps for at least two component carriers may be modified. For example, the repetition period may be increased (the frequency of the gaps is reduced) or decreased. For example, as shown in FIG. 5A, the repetition period 510 of the gaps for each of carriers 502 and 504 are doubled to 20 subframes compared to the 10 subframe periods 410 shown in FIG. 4, meaning the gaps occur half as frequently. This may also be thought of as effectively 'canceling' every second gap on each of carriers 502 and 504.

As previously mentioned, according to LTE Release 8, a measurement gap may have a MGRP of 40 ms or 80 ms (e.g. gap pattern 0 and 1, respectively). Thus in the present example, this repetition period would be doubled to from 40 ms to 80 ms, or from 80 ms to 160 ms. Thus in such a scenario, the total number of measurement gaps scheduled for the UE is reduced by 50%. In some situations, a reduction in the number of measurement gaps for a UE may not significantly reduce the performance of the network. For example, it may not be possible to perform measurements on multiple frequency bands during a 6 ms measurement gap (the gap length according to LTE Release 8) or even during simultaneous 6 ms gaps on two or more component carriers. In such a situation, subsequent measurement gaps may be needed in any event in order to perform measurements on the multiple frequencies, frequency bands, and/or RATs.

In addition, the gaps shown in FIG. 5A alternate in time so that the gaps for carrier 502 are interspaced with and do not overlap with the gaps for carrier 504. Although the measurement gaps of one component carrier are shown as being approximately centered in time in a data communication period of the other of the component carriers (e.g. gap 512 relative to data period 510), this is not necessary in all embodiments. Rather, the measurement gaps for two or more component carriers may be scheduled relative one another in any suitable way. In at least one embodiment, the gaps are scheduled so that the gaps of one component carrier do not overlap with the gaps of another component carrier, as shown in FIG. 5A.

It is typically the network that allocates measurement gaps for a UE. The network may allocate a gap configuration for the UE and may then notify or indicate the allocation to the UE.

Figure 6:
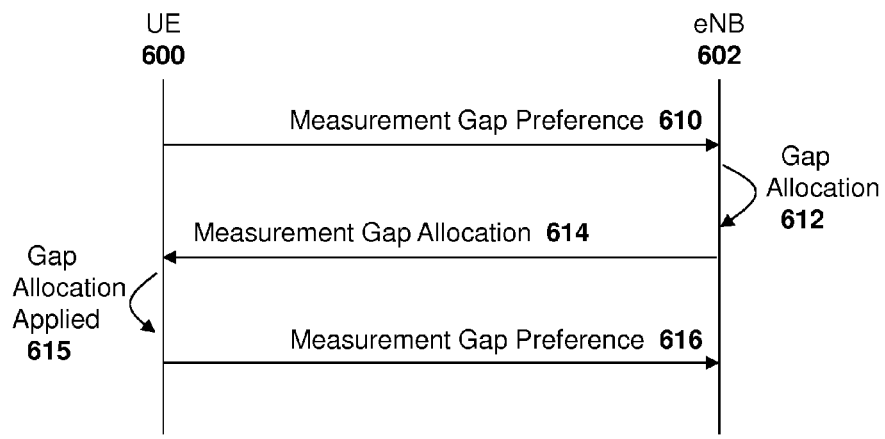
FIG. 6 is a data flow diagram showing a process for configuring measurement gaps.

FIG. 6 shows an example process for configuring measurement gaps according to the present disclosure. UE 600 may indicate to the network or network element, for example a base station 602 (e.g. an evolved Node B) a preference or request relating to measurement gap configuration for the UE. This preference may be indicated or communicated 610 to the network in any suitable way. In one embodiment, the preference may be sent by way of a specific measurement gap request message. In another embodiment, the preference may be included in another uplink message sent from the UE to the network. The network 602 may then allocate 612 a gap configuration for one or more component carriers of UE 600. The allocation may then be indicated or communicated 614 to the UE 600 in any suitable way. For example, the allocation may be communicated by way of a specific measurement gap allocation message, or the allocation may be included in another downlink message. UE 600 may then implement or apply 615 the allocated gap configuration. In addition, UE 600 may at a later time indicate to network 602 another preference relating to a measurement gap configuration for the UE by way of a further gap preference indication 616. Network 602 may then allocate another measurement gap allocation for the UE (not shown). Therefore multiple gap preference indications and/or gap allocations may be exchanged between UE 600 and network 602.

As shown in FIG. 6, in some situations, the UE may indicate to the network a preference or request relating to measurement gap configuration for the UE. This may be referred to a measurement "gap preference". For example, according to LTE Release 8, a UE may indicate to the network that it requires a measurement gap to be allocated. The network should then allocate one of the two patterns for the UE (either gp0 or gp1). However, according to one or more embodiments of the present disclosure, a gap preference indicated to the network by a UE may be that the UE wants or prefers a particular gap configuration or pattern. A gap preference may relate to any other type of gap configuration information, including one or more gap configuration characteristics or parameters. These can include but are not limited to gap repetition period, gap length, and gap offset. The indication provided by the UE to the network may be in the form of an indication, a preference, a request, etc.

Although the terms gap preference and gap preference indication are used herein, these terms are not mean to be limiting. Other terminologies may be used. These may include but are not limited to measurement configuration preference, measurement configuration preference indication, measurement gap configuration preference, measurement gap configuration preference indication, measurement gap preference indication, or measurement gap preference.

In at least one embodiment, the UE may indicate to the network on the uplink that it desires alternate measurement gaps. A UE may do this for any suitable reason. For instance, a preference for alternate gaps may be based on a radio condition(s) measured at the UE over one or more component carriers. For example if the radio conditions of the current serving cell(s) are good in order to avoid the loss of throughput caused by measurement gaps. On the other hand, if the current radio conditions degrade, then the UE can request or indicate to the network that it wants to switch back to the simultaneous gaps. Such switching may be implemented dynamically through Medium Access Control (MAC) Control Element signaling elements, statically through RRC signalling, or using any other suitable means.

In one embodiment, a UE may indicate a preference to the network that it wants alternate measurement gaps or that it does not want alternate gaps. The network may then take the preference into account when it allocates the gap configuration for the UE. However, the network may make the final determination and thus may be not required to allocate the desired gap configuration for the UE. In other words, the network need not obey the preference. An uplink UE gap preference indication may indicate that the UE thinks it could benefit by using alternate gaps rather than a current gap allocation. For example, this may be because the UE believes that the measurement would not be degraded, and/or that the transmission may possibly improve. A preferred measurement gap configuration may or may not refer to the gap configuration currently allocated to the UE or to a specific component carrier of the UE.

In at least one embodiment, a gap preference indication for alternate gaps may include a preference for one or both of a specific gap repetition period and a specific gap length, which would be applied for gaps for all carriers. In another embodiment, a gap preference indication for alternate gaps may refer to a currently allocated gap configuration or to a default gap configuration. For example, a preference indication may include a preference for one or more of longer/shorter gap repetition period, and longer/shorter gap lengths, than what is currently allocated or specified as a default. The longer/shorter repetition period and/or gap length would be applied to all component carriers. In a further example, a currently allocated or default gap configuration may be a non-alternating configuration, such as a configuration specified in LTE Release 8 (e.g. gp0, gp1) or any other configuration. Thus a gap preference may be for an alternating version of gap pattern gp0, meaning that the gap repetition period and gap length are the same as those specified for gp0 but that gaps of two carriers would alternate in time. In another scenario, a gap configuration may have already been allocated, for example gp1. In this scenario, a gap preference may be for an alternating version of the currently allocated configuration, which in this scenario is gp1. However, these are only examples and other options are possible.

A particular gap preference indication, including a preference for alternating gaps, may be sent by a UE to a network for any suitable reason, including those previously described. For example, a UE may determine or contemplate that a different gap configuration may result in improved performance. In addition, one or more component carriers or serving cells may be favored or have a higher priority than one or more other carriers or serving cells. Furthermore, the loading of one or more serving cells may be taken into account. In addition, radio conditions between the UE and one or more of its serving cells may also be considered. Again, these reasons and factors are only examples and are not meant to be limiting.

In another embodiment, a gap preference may be treated by the network as a request, meaning that the network is to obey the indicated gap configuration preference. Whether or not a gap preference is to be obeyed by the network may be indicated to the network, possibly in a gap preference message or indication provided to the network by the UE. In another embodiment, gap preference indications either from one or more specific UEs or from all UEs may be treated by a network as requests. Other options are possible.

Once the UE gap preference indication (e.g. preference, request) has been provided to the network, the network may then allocate a gap configuration for the UE. The downlink allocation sent by the network may have to be modified from allocations used in LTE Release 10 in order to inform the UE of one or more alternate gaps configurations according to the present disclosure. To allow a correct synchronisation on a MAC level between a UE and a network, there may need to be a common understanding between UE and network as to which measurement gap configuration or pattern is to be associated with which component carrier.

The present disclosure provides several ways to achieve this. In at least one embodiment, the network may allocate new gaps to the UE in an enhanced downlink indication or message.

Again, the following is described having reference to a UE utilizing two component carriers. However, this is not intended to be limiting. The present teachings may be applied or extended to situations where a UE utilizes more than two component carriers.

In at least one embodiment, the network may allocate to the UE two gap configurations, one for each of the component carriers. The network may indicate which gap configuration is associated with which carrier. In another embodiment, instead of indicating which gap configuration is associated with which component carrier, the network may indicate that a particular gap configuration is to be applied for a specific PCell or SCell. The UE may be able to associate a specified PCell or SCell with a specific component carrier. Furthermore, each gap configuration may include a gap pattern (e.g. gap repetition period, gap length, etc.). The network may also indicate timing information to the UE, such as one or more gap offsets, specifying exact timing or relative timing of the two gap configurations.

In at least another embodiment, the network may indicate one measurement gap pattern, which may include timing information (e.g. offset information) for the specified gap pattern. A default time difference (or "offset difference") may be added to the specifications. A measurement gap to be used for the PCell, which may include pattern and/or timing information, may also be added to or otherwise defined in the specifications. For example, a gap pattern for at least one component carrier may be one of those defined in an existing specification, for example in LTE Release 8, with the addition of an indication that the pattern is to only apply to the one or more carriers (meaning not all component carriers). In addition, a gap pattern to be used for an SCell may be added to or otherwise defined in the specifications. The timing to be used for the SCell may be defined by a time difference, which may be a difference between the offsets for gaps for the PCell and the SCell(s) In other words, a time difference may be the difference between the start of the gaps between the two gap patterns. This time difference may be defined as (gap length+gap repetition period)/2 so that the gaps on one component carrier are spaced equally between the gaps on the other component carrier. Such as situation is shown in FIG. 5A. However, the default time difference may be defined in any other suitable way or provided with any suitable value(s). In another embodiment, the timing for gaps associated with the SCell (or any other component carrier) may be provided by the network without referring to a time difference between the two measurement gaps.

In at least another embodiment, the network may indicate a gap allocation to the UE that is relative to a measurement gap configuration already allocated to the UE. For example, the network may indicate that a currently allocated gap repetition period for both component carriers is to be modified by a multiplication factor (hence leading to a new gap repetition period). The factor may be greater or lesser than 1. The network may also indicate that a gap offset for one of the component carriers is to be modified so that the gaps of the two carriers are no longer simultaneous. For example, a gap offset for the gaps of one of the component carriers may be calculated as a default value old offset+new gap repetition period/2 (or, (gap length+new gap repetition period)/2), so that the two gap patterns alternate in time. However, any other suitable gap offset may be applied.

In at least another embodiment, the gap repetition periods of the two component carriers may be unchanged but the gap offset for one of the component carriers is modified so that the gaps of the two carriers are not simultaneous. The new gap offset may have any suitable value so long as the gaps of the two carriers are not simultaneous. In one embodiment, the gap offset of the gaps for one of the two component carriers may be calculated by (gap length+gap repetition period)/2. This may result in the gaps for one carrier being approximately centered in time between the gaps for the other component carrier. However, this is only an example and the gaps for the two carriers need not be equally interspaced in time.

The foregoing embodiments are only examples and are not intended to be limiting. For example, above described modifications to the gap configurations for the PCell and SCell(s) may be reversed.

Furthermore, in at least one embodiment, the network may allocate a measurement gap configuration for a UE, possibly including alternate gaps, without or before receiving a gap preference from a UE. For example, a network may receive measurement reports from the UE regarding the one or more component carriers. A measurement report may indicate a radio condition(s) measured at the UE. Thus these reports may enable the network to assess the quality on each component carrier and accordingly allocate a measurement gap configuration for the UE based on the reported qualities. However, in some situations the reports received by the network from the UE may be somewhat old and thus not as accurate or up-to-date as the measurement data available on a UE. In addition, the reports may not contain all of the measurement data available to the UE.

In another embodiment, the network may have knowledge of the location of the UE within one or more cells, or may have other location-based information regarding the UE. As the network may also have information about the network topology and/or frequency allocation, the network may be able to determine or infer from the UE location information one or more frequencies or frequency bands that may provide better or worse radio conditions at the UE. Based on such information, the network may allocate a gap configuration for the UE without considering a gap preference of the UE.

Furthermore, in at least another embodiment, a default gap configuration for one or more UEs may be defined. A default gap configuration may be used to allocate a gap configuration for a UE, for example before an indication is received by the network from the UE. For example, the default may be that alternate gaps, or some other gap configuration, are not allocated for one or more UEs. The default gap configuration may be defined in the standards, and/or may be set at the network.

In some embodiments, a measurement gap of one component carrier may be spaced equally between measurement gaps of another component carrier, as shown in FIG. 5A. However, in other one or more other embodiments, this need not be the case. A gap for one component carrier may be scheduled at any suitable time(s) relative to the gaps of another carrier component.

Furthermore, some embodiments may include one or more inhibit mechanisms for limiting the number or frequency of gap preference indications that the UE sends to the network. In one embodiment, the network may indicate to the UE that the UE is not to send any further gap preference indications to the network, either at all or for a specific time period. In another embodiment, the UE may have to be configured by the network to send such preferences. For example, in one embodiment, the network may have to send a specific indication to the UE to enable this functionality. In some embodiments, an inhibit timer may be used. A timer value may be chosen or set by the network, or possibly predefined or standardized. A timer or other mechanism may be used to keep track of a time period during which the UE is not allowed to send a gap preference indication after having sent a previous one. In addition, the inhibit mechanism may limit a UE sending a maximum number of preference indications during a given time period. Other ways for limiting the number or frequency of gap preference indications sent or indicated by a UE are also possible.

In addition, one or more of the foregoing embodiments may be implemented for a UE that utilizes more than two component carriers. In other words, the above teachings are not intended to be limited to UEs employing only two component carriers.

The present disclosure further provides some signaling and coding that may be used to implement some of the aforementioned embodiments.

For example, a gap preference indication sent by a UE to the network could for example be included in a UEAssistanceInformation message that is sent to the network when the UE is in RRC_CONNECTED (in connected mode).

A new specific field/information element may be introduced, for example called GapIndication. In another example, a gap preference may be included within the field powerPrefIndicationConfig that is inside this field within the same message. However, the indication may be sent using any other suitable uplink message.

As previously mentioned, a UE may indicate to the network that the UE wants or needs alternate gap patterns. In at least one embodiment, a new MeasGapIndication information element (IE) may be included in a UEAssistanceInformation message as shown in Appendix A.

The new MeasGapIndication information element may be used to provide information relating to a UE measurement gap preference, and may take any suitable form. Appendix B shows one version of a new MeasGapIndication information element and its associated field description. The element may either have the value AlternateGapsNeeded or AlternateGapsNotNeeded.

Appendix C shows another version of a new MeasGapIndication information element and its associated field description. Here, the element may have one of the two values normal and alternateGaps.

Appendix D shows another version of a new MeasGapIndication information element and its associated field description. Like the version shown in Appendix C, the element may have also one of the two values normal and alternateGaps. However, this version has a different field description.

In the example versions shown in Appendix B through Appendix D, the particular names given to the new fields and associated values are not important and may be varied. For example, the possible values of MeasGapIndication may be 'needed' and 'not needed'. Furthermore, new MeasGapIndication information element may have any other suitable name, for example "MeasPrefIndication", which may stand for UE measurement preference indication. Other options are possible.

The above solutions are only examples. Other codings are possible. For example, in an another embodiment, rather than introducing a new MeasGapIndication information element (IE), a different or additional new information element AlternateGapsNeeded may be used. The presence of this element, for example in a UEAssistanceInformation message, can implicitly indicate that alternate measurement gaps are 'needed' by the UE. The absence of the element can implicitly mean alternate gaps are 'not needed'. Appendix E shows an example UEAssistanceInformation message including the new information element AlternateGapsNeeded. Appendix E further includes a field description for the new AlternateGapsNeeded information element.

The name of the new AlternateGapsNeeded information element as well as the language in its associated field description may be modified to reflect the type of indication that the UE provides to the network. For example, the word "needed" may be used when the preference is truly a preference (e.g. a suggestion) and thus need not be obeyed by the network. If the preference is a request or demand rather than a true preference, and therefore is to be obeyed by the network, another word such as "required" may be used instead of "needed" in one or both of the field name and description (e.g. AlternateGapsRequired). Any other suitable words and language may be used.

One or more different indications from the UE may be used other than those indicating that alternate gaps are needed. For example, a gap preference indication may take into account or reference a gap pattern already defined LTE Release 10. For instance, in one embodiment, an indication can indicate 'need for alternate gaps based on gap pattern 0' or 'need for alternative gaps based on gap pattern 1'.

In another embodiment, the UE gap preference indication may reference a gap pattern already allocated to the UE, for example gap pattern 0 or 1. For example, such an indication may denote 'alternate gaps of the already used gap needed' or 'non-alternate of the already used gap needed'.

As previously discussed, a UE gap preference may only be a suggestion and thus the network may still make the final decision on measurement gap allocation for the UE. In another embodiment, the network may allocate a measurement gap configuration without having received or prior to receiving the UE gap preference indication. For example, the network may modify a measurement gap configuration from 'alternate' to 'normal' after the network becomes aware of deteriorating radio conditions reported by the UE. In another embodiment, the network can take into account both a received UE gap preference indication and radio conditions reported by the UE in allocating a gap configuration for the UE.

As previously mentioned, a network may treat a received gap preference indication as a request and thus may obey the request. In such a case, error handling may be used to deal with a situation where the network does not or is unable to allocate what was indicated by the UE in the preference indication.

Furthermore, the UE action related to the transmission of a UEAssistanceInformation message that includes a UE measurement gap preference may be added to 3GPP TS 36.331. Reference is made to Table 3 below, which shows an addition to 3GPP TS 36.331, and in particular, a new Section 5.6.x.y. This example includes an inhibit timer T840 that is started with a timer value of measGapPrefIndication-Timer.

TABLE 3

3GPP TS 36.331 Addition
5.6.x.y Actions related to transmission of
UEAssistanceInformation message The UE shall:
1> if the UE prefers a measurement gap configuration optimised for alternate gaps:
   2> set measGapPrefIndication to alternateGaps;
1> else:
   2> start timer T840 with the timer value set to the measGapPrefIndication-Timer;
   2> set measGapPrefIndication to normal.

TABLE 3-continued

3GPP TS 36.331 Addition
5.6.x.y Actions related to transmission of
UEAssistanceInformation message The UE shall submit the UEAssistanceInformation message to lower layers for transmission.

Furthermore, in at least one embodiment, upon a handover a UE gap allocation or configuration may be reset. The gap configuration for one or more component carriers may be reset. A gap allocation may be reset, for example, because after frequency(ies) or cell(s) reallocation following e.g. handover or RRC Connection Reconfiguration, one or more system, radio, or other conditions may have changed. In one embodiment, the network may allocate a default gap configuration for one or more component carriers of the UE and then indicate this new allocation to the UE. Furthermore, in at least one embodiment, the UE itself may set a gap configuration for one or more component carriers to a default gap configuration in response to a handover. For example, a UE may do this in response to receiving a RRC Connection Reconfiguration message indicating a handover. However, the UE may become aware of handover in any other way. Accordingly, the gap configuration allocations for one or more component carriers of the UE may be set to a default configuration(s). One or more default gap configurations may be added to or otherwise defined in the specifications. This is different than a power preference indication already defined in 3GPP TS 36.331 and sent in the message UEassistanceInformation. Therefore a UE gap preference indication may need to be sent more often than a power preference indication of the UE.

Once the network has allocated a measurement gap configuration for a UE, possibly allocating one or more alternate gap patterns for different component carriers, the allocation may be communicated to the UE.

To allow for "alternate" gap configurations, various standards and specifications may be amended. Once again, the following is described in terms of a UE utilizing two component carriers. However, this is not meant to be limiting.

In one embodiment, the already existing MeasGapConfig information element may be modified to allow for the allocation of alternate measurement gaps. In another embodiment, new MeasGapConfig-r11 information element may be introduced to allow for backward compatibility. This avoids having to modify the already existing MeasGapConfig information element. For example, in RRC connected mode, the network would know if the UE supports Release 11 or not and thus would know whether the UE can understand this new information element (if this scheme is introduced as mandatory for a Rel-11 UE). Therefore the network would send the MeasGapConfig-r11 version of the information element to the UE and not the older MeasGapConfig. In another embodiment, if this scheme is introduced as optional for a Rel-11 UE (or optional for any other release as release independent), the UE would have previously indicated to the network that the UE supports this functionality (e.g in a UE capability uplink communication).

Accordingly, in at least one embodiment, a new MeasGapConfig-r11 information element is defined, which may be added to 3GPP TS 36.331. This new element may be included in a MeasConfig information element that is sent to a UE in RRC connected mode. One example MeasGapConfig-r11 element, and its associated field descriptions, is provided in Appendix F.

In the version of MeasGapConfig-r11 provided in Appendix F, values of the field gapOffset within the new MeasGapConfig-r11 may be based on LTE Release 8, namely gap pattern 0 (gp0) and gap pattern 1 (gp1). In particular, gp1a and gp1b can be seen as gap alternative versions of gp0. Thus in one example both gp1 a and gp1 b may have a measurement gap repetition period (MG RP) value of 80 ms. In addition, gp1a is associated with a first component carrier (carrierFreq1) and gp1b is associated with a second component carrier (carrierFreq2). Similarly, gp2a and gp2b are gap alternate versions of gp1, meaning they each may have a value of 160 ms. In addition, gp2a is associated with a first component carrier (carrierFreq1) and gp2b is associated with a second component carrier (carrierFreq2). Furthermore, the gapOffsets, which define the positions of the gaps within a timeframe, may be chosen by the network so that the gap patterns for the two component carriers do not overlap in time. The values of measurement gap repetition period provided above are only examples and other values are possible.

A modified MeasConfig information element including the new MeasGapConfig-r11 information element is shown in Appendix G.

This version of a new information element (MeasGapConfig-r11) to communicate an alternate gap allocation to a UE is only an example. Other codings (fields, information elements, messages, etc.) that implement the solutions of the present disclosure are possible.

The timing of measurement gaps in terms of subframe number is now discussed. Existing subclause 5.5.2.9 of 3GPP TS 36.331, version 10.5, defines a subframe number (SFN) and subframe for measurement gaps. This allows for the use of alternate gaps to gp0 (or gp1) that may have the same length (6 ms), twice as long measurement gap repetition periods, and being located at different SFN/subframes. Subclause 5.5.2.9 is reproduced below in Table 4.

TABLE 4

3GPP TS 36.331, Subclause 5.5.2.9
5.5.2.9 Measurement gap configuration

The UE shall:
1> if measGapConfig is set to setup:
   2> if a measurement gap configuration is already setup, release the measurement gap configuration;
   2> setup the measurement gap configuration(s) indicated by the measGapConfig in accordance with the received gapOffset(s), i.e., each gap starts at an SFN and subframe meeting the following condition:
      SFN mod T = FLOOR(gapOffset/10);subframe = gapOffset mod 10;
      with T = MGRP/10 as defined in TS 36.133;
1> else:
   2> release the measurement gap configuration;

As previously mentioned, in order to implement one or more embodiments of the present alternate gaps approach, one or more standards and/or specifications may be modified. For example, in at least one embodiment, subclause 8.1.2.1 of 3GPP TS 36.133 may be modified as shown in Appendix H. Thus in this embodiment, subclause 8.1.2.1 is amended to require that the E-UTRAN provides single or dual measurement gap patterns. The subclause is also modified to require that during gaps (1) the UE shall not transmit any data on the carrier frequency to which the gap is associated with, and (2) the UE is not expected to tune the receiver on the E-UTRAN serving carrier frequency to which the measurement gap was configured. In addition, Table 8.1.2.1-1 of the subclause is amended to add new Gap Pattern ID '2' having a length of 6 ms and a repetition period of 160 ms.

Other modifications and other wording may be used when implementing solutions of the present disclosure. For example, in one embodiment (not shown), subclause 8.1.2.1 may require that the E-UTRAN or network provide "single or multiple measurement gap patterns" to allow for the possibility of more than two gap patterns being allocated for a UE utilizing more than two component carriers. In yet another embodiment, the subclause may be modified to require that during gaps, the UE is not expected to tune the receiver "associated with the corresponding gap pattern on the E-UTRAN serving carrier frequency". Other modifications and coding options are possible.

As mentioned above, an already existing MeasGapConfig information element may be modified, or "extended", to allow for the allocation of alternate measurement gaps rather than introducing a new MeasGapConfig-r11 information element as described above. An example of a modified MeasGapConfig element along with associated field descriptions are shown in Appendix I. Here, the field gapOffset is retained and new fields gapOffset1 and gapOffset2 are added. Thus as before, the network may allocate either gap pattern 0 (gp0) or 1 (gp1) to the one or more serving frequencies of the UE. However, the amendments allow the network to allocate gap patterns gp1 a and gp1 b having a repetition period of 80 ms to carrier component 1 (carrierFreq1) and 2 (carrierFreq2), respectively. In addition, the network may allocate gap patterns gp2a and gp2b having a repetition period of 160 ms to carrier component 1 (carrierFreq1) and 2 (carrierFreq2), respectively.

In addition, since new fields gapOffset1 and gapOffset2 are added to a MeasGapConfig information element, subclause 5.5.2.9 of 3GPP TS 36.331 may be modified accordingly. In at least one embodiment, subclause 5.5.2.9 may be modified as shown below in Table 5.

TABLE 5

Modification of Subclause 5.5.2.9 in 3GPP TS 36.331
5.5.2.9 Measurement gap configuration The UE shall:
1> if measGapConfig is set to setup:
   2> if a measurement gap configuration is already setup, release the measurement gap configuration;
   2> setup the measurement gap configuration(s) indicated by the measGapConfig in accordance with the received gapOffset(s), i.e., each gap starts at an SFN and subframe meeting the following condition:
      SFN mod T = FLOOR(gapOffset/10); (respectively: gapOffset1 or gapOffset2)
      subframe = gapOffset mod 10; (respectively: gapOffset1 or gapOffset2)
      with T = MGRP/10 as defined in TS 36.133;
1> else:
   2> release the measurement gap configuration;

Furthermore, in at least one embodiment, measurement gaps may be scheduled for a UE so that no gaps for different component carriers ever overlap in time. In another embodiment, the measurement gaps may be scheduled so that the UE can communicate with the network on at least one of the component carriers at any given time. In other words, there is no point in time at which gaps are scheduled simultaneously on all component carriers. As previously discussed, scheduling simultaneous gaps on component carriers can reduce throughput of the communications system and have a particularly adverse effect on real time services.

In order to implement these gap timing requirements, one or more standards and/or specifications may be modified. For example, a standard or specification could be amended to provide that "the network can choose the gapOffsets so that the measurement gaps do not overlap to avoid impacting data throughput for real time services", or "choosing gapOffsets that lead to non-overlapping measurement gaps would allow to minimise the throughput impact for real time services". Of course these are only examples and other options are possible.

Gaps of Different Repetition Periods and/or Lengths (Independent Gaps)

According to another aspect of the present disclosure, measurement gaps having different repetition periods and/or lengths may be scheduled for different component carriers of a UE operating in a carrier aggregation environment. Gaps having different offsets may also be scheduled. For descriptive purposes only, this aspect is herein referred to the "independent gaps approach".

This approach may provide for increased flexibility compared to the alternate measurement gap approach described above since one or both of the frequency and the length of the gaps for a specific component carrier may be configured independently of the gaps of a different component carrier. This approach may allow the wireless system to better cope with various situations and factors affecting one or more of the various component carriers of a UE.

In an example scenario, a first component carrier of a UE may be operating at frequency F1. If the radio conditions on F1 degrade to a certain threshold, the UE could indicate to the network that it needs or wants more frequent measurement gaps and/or longer gaps on the first component carrier. The network may then reallocate the gaps for the UE on the first carrier independently of the allocations for the other component carrier(s). In some embodiments, the allocation(s) for the other component carrier(s) may not be changed.

Figure 7:
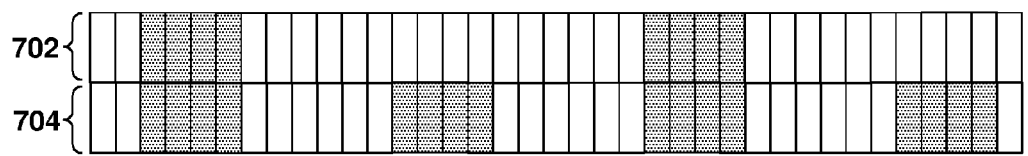
FIG. 7 is a diagram showing transmissions with measurement gaps having different gap repetition periods on two component carriers at a UE.

FIG. 7 provides an example of measurement gaps having different repetition periods for different component carriers. FIG. 7 is a block diagram that may represent example LTE subframe communications at a UE on two component carriers 702 and 704. The measurement gaps are scheduled twice as frequently for carrier 704 relative to carrier 702. In other words, the gap repetition period for carrier 704 is half of the repetition period for carrier 702. The gap lengths are the same for both carriers.

In one or more embodiments of the alternate gaps approach provided above, the measurement gaps are "long-term equivalent" as between the two or more component carriers. Although the gaps of the multiple component carriers do not overlap in some embodiments, their repetition periods and gap lengths are the same. Therefore on average, all of the component carriers are provided with the same total gap time. When this is the case, it may not always be important or even necessary to consider which gap patterns and offsets are allocated to which component carriers since all carriers will be provided with the same number of gaps having the same lengths.

On the other hand, when different component carriers of a UE are allocated different repetition periods and/or lengths, the gap allocations may not be "long-term equivalent" since the carriers may not be provided with the same overall total gap time over a given time period. In addition, the system may benefit from allocating a particular gap configuration for a particular component carrier, for instance as radio conditions change on the component carrier. For example, if radio conditions degrade on a component carrier, the carrier may be allocated larger gaps and/or more frequent gaps. On the other hand, if conditions improve, the carrier may be allocated shorter and/or less frequent gaps.

Accordingly, in at least some embodiments of the present disclosure, a particular gap configuration may be allocated for a particular component carrier. Thus in at least one embodiment, a UE may indicate to the network that one or more gap preferences are associated with one or more specific component carriers of the UE.

As with the alternate gaps approach provided above, in the present independent gaps approach there are several ways in which the UE may indicate its gap configuration preference to the network. A UE gap preference may be for one or more of the component carriers of the UE. In addition, a UE gap preference may be for one or more characteristics or parameters of a gap configuration (e.g. repetition period, gap length, offset, etc.).

In one embodiment, the UE may provide a UE gap preference indication to the network that explicitly indicates some gap configuration information (e.g. a gap characteristic, parameter, etc.). As an example, a UE may indicate that it wants or needs gap pattern 1 for component carrier A. An explicit indication may be for one or more component carriers of the UE, or for one or more frequencies.

In another embodiment, a UE may provide a UE gap preference indication to the network that indicates some gap configuration information in relative terms. For instance, a UE gap preference may be relative to an already allocated measurement gap configuration for the UE or for one or more specific component carriers. For example, the gap preference indication may indicate that the UE wants to increase or decrease one or more of a repetition period and a length of a measurement gap(s). The relative preference indication may be relative to a currently allocated gap configuration for the UE.

Some further examples of possible relative UE gap preferences include 'more frequent gaps needed', 'less frequent gaps needed', 'smaller gaps needed', 'bigger gaps needed', 'half frequent gaps needed, 'twice frequent gaps needed, '4 times more frequent gaps needed', '4 times less frequent gaps needed', etc. This list of examples is not exhaustive. Other relative preferences indications are possible.

In yet another embodiment, a UE may provide a UE gap preference indication that makes use of or is based on information previously received from or otherwise known to the network, which may include a list of one or more serving frequencies. In one example, a UE may refer to or indicate one or more component carriers using an identifier that is known to the network.

In another example, in LTE, the network indicates the frequencies of serving cells to the UE in a MeasConfig information element that is included in the RRC Connection Reconfiguration message. A UE may receive more than one instance of the MeasConfig element, and the information may be consolidated and stored in the internal UE variable VarMeasConfig. The VarMeasConfig information element makes use of the general index measObjectId, which refers to a number of frequencies previously indicated by the network. A measObjectId identifies a measurement object (e.g. frequency, cell, etc.) to be measured by the UE. Thus the UE may re-use one or more of the identities to refer to one or more frequencies. Therefore, in one embodiment, the UE gap preference indication to the network may be based on or include a number of measObjectId (a list of measId) (this may make use of the already existing structure MeasId-ToAddModList from the downlink).

Each measObjectId may refer to a number of serving and neighbour cells. However, in at least one embodiment, only the serving cells referenced by each measObjectId (a serving frequency configured for carrier aggregation) are utilized. Accordingly, one or more standards and/or specifications may be amended to clarify that it is the serving cells referenced by each measObjectId which may be utilized, and not the neighbour cells.

Once the UE gap preference has been indicated to the network, the network may then allocate a gap configuration for the UE. Unlike the alternates gap approached described above, here a gap configuration may be allocated for a first component carrier independently of a gap configuration for a second component carrier.

In one embodiment, when a UE indicates a preference to the network, the network may take the preference into account when it allocates the gap configuration. In other words, the network may make the final determination and thus is not required to allocate the indicated preferred gap configuration for the UE.

In another embodiment, the UE may indicate a gap preference to the network and the network may be required to allocate the gap configuration indicated by the UE if possible. In other words, the network may not be permitted to decide to allocate a different gap configuration for the UE.

In order to implement the above functionality, one or more standards or specifications may be amended. For example, in at least one embodiment, a new MeasPrefIndication information element may be defined, for example in 3GPP TS 36.331, to provide information related to measurement gap pattern preference(s). One embodiment of a new MeasPrefIndication along with associated field descriptions is provided in Appendix J. However, it is to be appreciated that another information element or structure may be created or used.

The MeasPrefIndication shown in Appendix J allows a first gap indication or preference (firstGap-Indication) to be associated with one or more component carriers (Gap-IndicationList). It also allows a second gap indication or preference (secondGap-Indication) to be associated with one or more component carriers (Gap-Indication List). Furthermore, a Gap-IndicationList may include a pattern-Indication field, which can have a value of 'no change', 'more gaps', or 'less gaps'.

A 'more gaps' value may be defined or interpreted in any suitable way to provide for an increase in measurement gaps. For example, 'more gaps' may be defined to mean that the measurement gap period is to be divided by two (or some other number >=1). In another embodiment, 'more gaps' may be defined to mean that a new pre-defined pattern that defines more gaps is to be allocated. Similarly, a 'less gaps' value may be defined or interpreted in any suitable way to provide for a decrease in measurement gaps. For example, 'less gaps' may be defined to mean that the measurement gap period is to be multiplied by two (or some other number >=1). In another embodiment, 'less gaps' may be defined to mean that a new pre-defined pattern that defines less gaps is to be allocated. Other options are possible.

In addition, a new MeasPrefIndication information element may be included in a UEAssistanceInformation message to be sent from a UE to the network. Appendix K shows a modified UEAssistanceInformation message including a MeasPrefIndication information element.

In at least one embodiment, a different new MeasPrefIndication information element may be defined to provide information related to measurement gap pattern preference(s). This information element may make use of or be based on information previously received from the network, as described above. One version of a different new MeasPrefIndication along with associated field descriptions is provided in Appendix L. This version utilizes measObjectIds to refer to frequencies and/or frequency groups.

The version of MeasPrefIndication in Appendix L also allows first and second gap preference indications (firstGap-Indication, secondGap-Indication) to be associated with one or more component carriers, which may be identified or referenced using one or more measObjectIds.

Once the gap configuration has been allocated for the UE by the network, the network indicates the allocation to the UE. This may be accomplished in the same or similar ways described above in relation to the alternate gaps approach. In addition, in some embodiments, the network may indicate that one or more gap configurations are associated or intended for one or more specific component carriers.

In one embodiment, a downlink gap allocation from the network may re-use one or more component carrier indications previously received from or otherwise known to the UE. For example, an uplink UE gap preference indication may have provided an association between a specific component carrier and a specific gap configuration. Thus in a downlink gap allocation, the network may merely indicate a gap allocation is associated with the specific gap configuration. The UE may then implicitly know that the gap allocation indicated by the network is intended for a specific component carrier.

In another embodiment, the network may indicate that a particular allocated gap configuration is to be applied for a specific PCell or SCell.

Again, in order to implement one or more embodiments of gaps of different repetition periods and/or lengths, one or more standards and/or specifications may be modified. For example, in at least one embodiment, subclause 8.1.2.1 of 3GPP TS 36.133 may be modified as shown in Appendix M. Some of the modifications are the same or similar to those discussed above in relation to the alternate gaps approach. For example, the E-UTRAN is required to provide single or dual measurement gap patterns. In addition, during gaps, the UE shall not transmit any data on the carrier frequency to which the gap is associated with. Furthermore, during gaps, the UE is not expected to tune the receiver to which the measurement gap was configured on the E-UTRAN serving carrier frequency. In addition, Table 8.1.2.1-1 of the subclause is modified to add new Gap Pattern IDs '2' and '3' having a lengths of 6 ms and repetition periods of 20 ms and 160 ms, respectively.

Furthermore, gap repetition periods and lengths may be chosen so gaps for different component carriers do not overlap. The network may specify different gapOffsets (time allocations) for the two gaps, for example as provided in the next paragraph. In the downlink gap configuration allocation to the UE, the network may need to indicate which allocation refers to the first and second frequencies or component carriers previously indicated by the UE, referring to the first or second gap preference indication.

A MeasGapConfig information element may be modified, or "extended", to allow for the allocation of different measurement gaps amongst different component carriers. An example of a modified MeasGapConfig element along with associated field descriptions are shown in Appendix N. Here, the field gapOffset is retained and new choices for first and second gap indications are added. Thus as before, the network may allocate either gap pattern 0 (gp0) or 1 (gp1) to the one or more component carriers of the UE. However, the amendments allow the network to alternatively allocate new gap patterns gp2 and gp3 having a repetition periods of 20 ms and 160 ms, respectively, for each component carrier (first and second gap preference indications). New gap patterns gp2 and gp3 correspond to those added to subclause 8.1.2.1 of 3GPP TS 36.133 as shown in Appendix M.

The modified MeasGapConfig shown in Appendix N is only an example and is not meant to be limiting. For example, for backward compatibility reasons, a new Release 11-specific (-r11) MeasGapConfig information element may be introduced, as is discussed above in relation to the alternate gaps approach.

In addition, in at least one embodiment, upper and/or lower bounds may be set on gap patterns. For example, if a UE indicates a preference for more frequent gaps and/or bigger gaps for a component carrier, but the component carrier has already been allocated the highest gap frequency (shortest repetition period) permitted and/or the biggest gap length permitted, then the indicated preference configuration is ignored by the network. Similarly, if a UE indicates a preference for less frequent gaps and/or smaller gaps for a component carrier, but the component carrier has already been allocated the lowest gap frequency (longest repetition period) permitted and/or the smallest gap length permitted, then the preferred configuration may not be implemented by the network. In another embodiment, instead of ignoring the indicated preferred gap configuration, the network may send back an error message to the UE.

Furthermore, in at least one embodiment, the network may allocate a measurement gap configuration for one or more component carriers of a UE without or before receiving a gap preference indication from a UE. This was described above in relation to the alternate gaps approach.

In addition, some embodiments may include one or more inhibit mechanisms for limiting the number or frequency of gap preference indications that the UE sends to the network. This was described above in relation to the alternate gaps approach.

The above alternate gaps approach and the independent gaps approach are not necessarily inconsistent. Therefore in at least some embodiments, the two approaches may be combined. For example, alternate gaps may be allocated for one or more component carriers, while other gap configurations may be allocated for one or more other component carriers. Of course the two approaches may be combined in any other suitable way.

Figure 8:
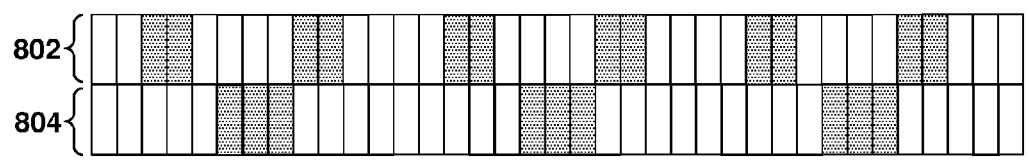
FIG. 8 is a diagram showing transmissions with measurement gaps having different gap repetition periods and gap lengths on two component carriers at a UE.
Figure 9:
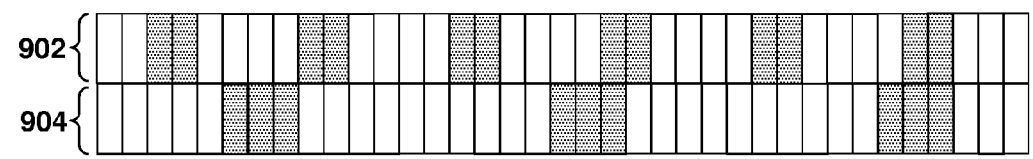
FIG. 9 is a diagram showing transmissions with measurement gaps having different gap repetition periods and gap lengths on two component carriers at a UE where the gaps sometimes overlap.

FIG. 8 shows an example where the measurement gaps for component carrier 802 have a shorter repetition period and a shorter length than the gaps for component carrier 804. In this particular example, the repetition period of gaps in carrier 804 is exactly twice as long as the period of gaps for carrier 802. However, it other embodiments the repetition period of gaps for one carrier need not be an integer multiple of the period of gaps for another carrier. Furthermore, the gap allocations shown in FIG. 8 do not result in any overlapping gaps as between the component carriers. However, in other embodiments the gaps of one carrier may overlap with the gaps of another carrier. Overlapping gaps may occur some of the time, meaning that there are periods when gaps of different carriers do not overlap. An example of this is shown in FIG. 9 where gaps for component carrier 902 sometimes overlap with gaps for component carrier 904. In other embodiments, overlapping gaps may occur all of the time, meaning that the gaps of a first carrier always overlap with the gaps of a second carrier, and/or vice versa.

The parameters of gap configurations (e.g. gap repetition period, gap length, gap offset, etc.) may be selected so that gaps of two or more component carriers never overlap, sometimes overlap, or always overlap.

Furthermore, in one or more embodiments of the present disclosure, a measurement gap allocation by the network may be based on one or more considerations or factors. Example considerations and factors were discussed above in discussing how greater flexibility in allocating gaps for a carrier aggregation UE may result in improved performance. Some or all of these factors and considerations, in addition to other considerations, may be taken into account by the network in the embodiments of the present independent gaps approach.

For example, in one embodiment, a measurement gap allocation may be based at least partly on one or more serving cells of the UE being more important or favored (e.g. having a higher priority) over one or more other serving cells of the UE. For example, the PCell of a UE may be favored over the one or more SCells since signalling and other important communications is performed via the PCell.

Furthermore, in at least one embodiment, a measurement gap allocation by the network may be based at least partly on a load or loading factor of at least one serving cell of the UE.

In addition, in at least one embodiment, a measurement gap allocation by the network may be based at least partly on radio conditions between the UE and one or more of its serving cells.

The above factors and considerations were described in more detail above in relation to the alternate gaps approach and may be equally applicable to the present independent gaps approach.

Although some of the signalling provided and discussed herein makes use of RRC signalling, any other type or types of signalling may be used, for example MAC signalling.

Further, the above embodiments may be implemented by any UE. One example device is described below with regard to FIG. 10.

UE 1000 may be a two-way wireless communication device having voice and data communication capabilities. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1000 is enabled for two-way communication, it may incorporate a communication subsystem 1011, including both a receiver 1012 and a transmitter 1014, as well as associated components such as one or more antenna elements 1016 and 1018, local oscillators (LOs) 1013, and a processing module such as a digital signal processor (DSP) 1020. Although not shown, communication subsystem 1011 may include additional components in order to implement carrier aggregation. For example, UE 1000 may comprise multiple receivers 1012 and/or transmitters 1014 to allow for simultaneous radio activity on multiple frequencies, frequency bands, and/or radio access technologies (RATs). For example, in addition to carrier aggregation, these additional communication components may be used to perform simultaneous measurements on multiple frequencies, frequency bands, and/or RATs. In addition, as will be apparent to those skilled in the field of communications, the particular design of the communication subsystem 1011 will be dependent upon the communication network in which the device is intended to operate. The radio frequency front end of communication subsystem 1011 can be any of the embodiments described above.

Network access requirements will also vary depending upon the type of network 1019. In some networks network access is associated with a subscriber or user of UE 1000. A UE may require a removable user identity module (RUIM) or a subscriber identity module (SIM) card in order to operate on a CDMA network. The SIM/RUIM interface 1044 is normally similar to a card-slot into which a SIM/RUIM card can be inserted and ejected. The SIM/RUIM card can have memory and hold many key configurations 1051, and other information 1053 such as identification, and subscriber related information.

Figure 10:
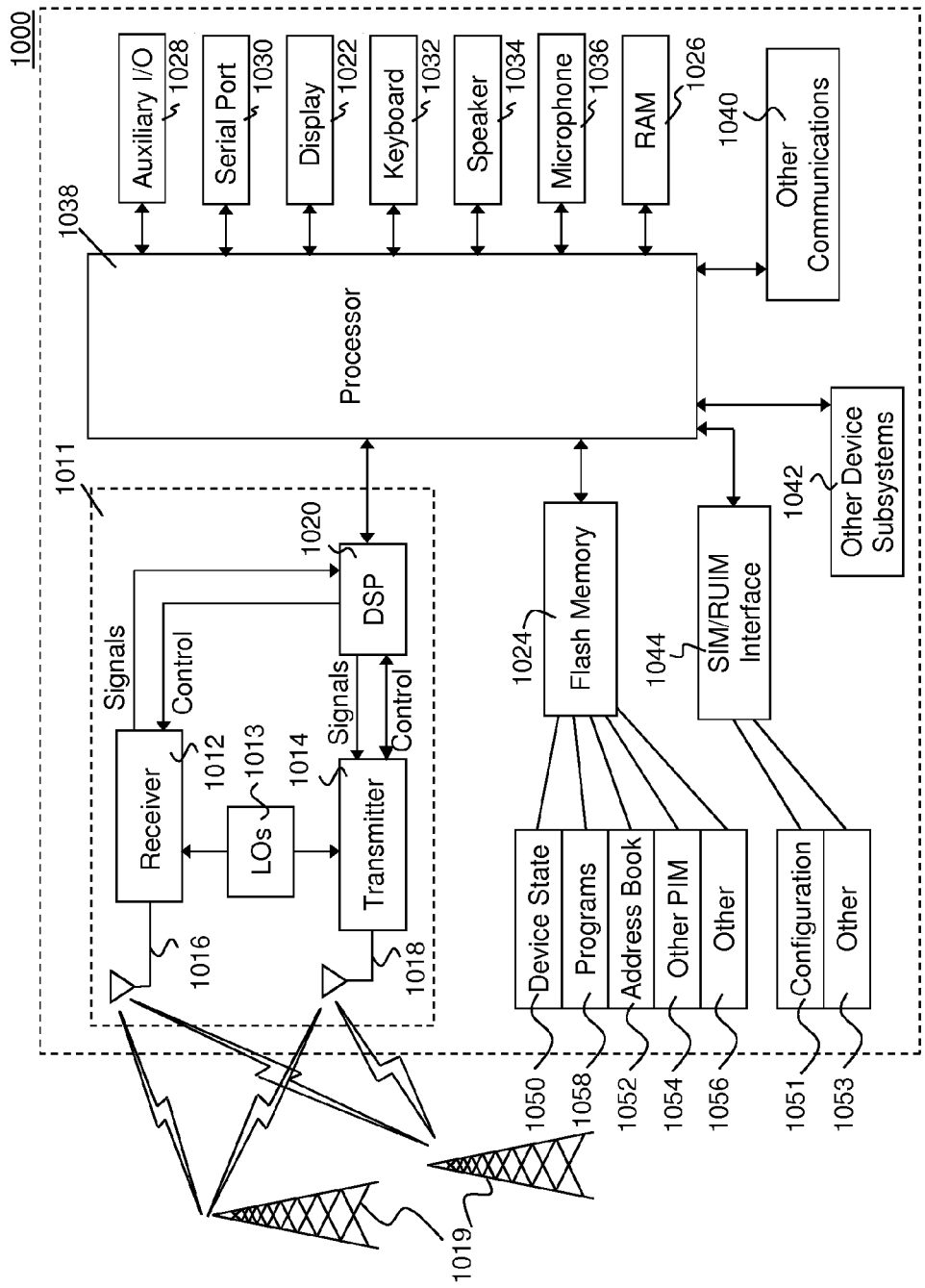
FIG. 10 is a block diagram of an example mobile device capable of being used with the embodiments of the present disclosure.

When required network registration or activation procedures have been completed, UE 1000 may send and receive communication signals over the network 1019. As illustrated in FIG. 10, network 1019 can consist of multiple base stations communicating with the UE.

Signals received by antenna 1016 through communication network 1019 are input to receiver 1012, which may perform such common receiver functions as signal amplification, frequency down conversion, filtering, channel selection and the like. A/D conversion of a received signal allows more complex communication functions such as demodulation and decoding to be performed in the DSP 1020. In a similar manner, signals to be transmitted are processed, including modulation and encoding for example, by DSP 1020 and input to transmitter 1014 for digital to analog conversion, frequency up conversion, filtering, amplification and transmission over the communication network 1019 via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

UE 1000 generally includes a processor 1038 which controls the overall operation of the device. Communication functions, including data and voice communications, are performed through communication subsystem 1011. Processor 1038 also interacts with further device subsystems such as the display 1022, flash memory 1024, random access memory (RAM) 1026, auxiliary input/output (I/O) subsystems 1028, serial port 1030, one or more keyboards or keypads 1032, speaker 1034, microphone 1036, other communication subsystem 1040 such as a short-range communications subsystem and any other device subsystems generally designated as 1042. Serial port 1030 could include a USB port or other port known to those in the art.

Some of the subsystems shown in FIG. 10 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list.

Operating system software used by the processor 1038 may be stored in a persistent store such as flash memory 1024, which may instead be a read-only memory (ROM) or similar storage element (not shown). Those skilled in the art will appreciate that the operating system, specific device applications, or parts thereof, may be temporarily loaded into a volatile memory such as RAM 1026. Received communication signals may also be stored in RAM 1026.

As shown, flash memory 1024 can be segregated into different areas for both computer programs 1058 and program data storage 1050, 1052, 1054 and 1056. These different storage types indicate that each program can allocate a portion of flash memory 1024 for their own data storage requirements. Processor 1038, in addition to its operating system functions, may enable execution of software applications on the UE. A predetermined set of applications that control basic operations, including at least data and voice communication applications for example, will normally be installed on UE 1000 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1019. Further applications may also be loaded onto the UE 1000 through the network 1019, an auxiliary I/O subsystem 1028, serial port 1030, short-range communications subsystem 1040 or any other suitable subsystem 1042, and installed by a user in the RAM 1026 or a non-volatile store (not shown) for execution by the processor 1038. Such flexibility in application installation increases the functionality of the device and may provide enhanced on-device functions, communication-related functions, or both. For example, secure communication applications may enable electronic commerce functions and other such financial transactions to be performed using the UE 1000.

In a data communication mode, a received signal such as a text message or web page download will be processed by the communication subsystem 1011 and input to the processor 1038, which may further process the received signal for output to the display 1022, or alternatively to an auxiliary I/O device 1028.

A user of UE 1000 may also compose data items such as email messages for example, using the keyboard 1032, which may be a complete alphanumeric keyboard or telephone-type keypad, among others, in conjunction with the display 1022 and possibly an auxiliary I/O device 1028. Such composed items may then be transmitted over a communication network through the communication subsystem 1011.

For voice communications, overall operation of UE 1000 is similar, except that received signals would typically be output to a speaker 1034 and signals for transmission would be generated by a microphone 1036. Alternative voice or audio I/O subsystems, such as a voice message recording subsystem, may also be implemented on UE 1000. Although voice or audio signal output is generally accomplished primarily through the speaker 1034, display 1022 may also be used to provide an indication of the identity of a calling party, the duration of a voice call, or other voice call related information for example.

Serial port 1030 in FIG. 10 would normally be implemented in a personal digital assistant (PDA)-type UE for which synchronization with a user's desktop computer (not shown) may be desirable, but is an optional device component. Such a port 1030 would enable a user to set preferences through an external device or software application and would extend the capabilities of UE 1000 by providing for information or software downloads to UE 1000 other than through a wireless communication network. The alternate download path may for example be used to load an encryption key onto the device through a direct and thus reliable and trusted connection to thereby enable secure device communication. As will be appreciated by those skilled in the art, serial port 1030 can further be used to connect the UE to a computer to act as a modem.

Other communications subsystems 1040, such as a short-range communications subsystem, is a further optional component which may provide for communication between UE 1000 and different systems or devices, which need not necessarily be similar devices. For example, the subsystem 1040 may include an infrared device and associated circuits and components or a Bluetooth™ communication module to provide for communication with similarly enabled systems and devices. Subsystem 1040 may further include non-cellular communications such as WIFI or WIMAX.

In addition, the above may be implemented by any network elements.

Figure 11:
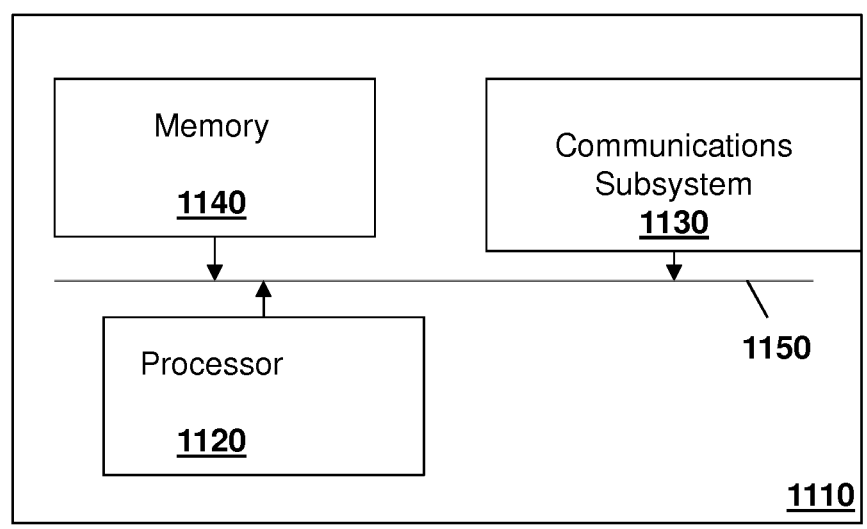
FIG. 11 is a simplified block diagram of a network element for use with the embodiments of the present disclosure.

In particular, the eNBs and network elements referred to and shown herein may be any network element, or part of any network element, including various network servers. Reference is now made to FIG. 11, which shows a generalized example network element.

In FIG. 11, network element 1110 includes a processor 1120 and a communications subsystem 1130, where the processor 1120 and communications subsystem 1130 cooperate to perform the methods of the embodiments described above.

Processor 1120 is configured to execute programmable logic, which may be stored, along with data, on network element 1110, and shown in the example of FIG. 11 as memory 1140. Memory 1140 can be any tangible storage medium.

Alternatively, or in addition to memory 1140, network element 1110 may access data or programmable logic from an external storage medium, for example through communications subsystem 1130.

Communications subsystem 1130 allows network element 1110 to communicate with other network elements.

Communications between the various elements of network element 1110 may be through an internal bus 1150 in one embodiment. However, other forms of communication are possible.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Furthermore, additional features and advantages of the present disclosure will be appreciated by those skilled in the art.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Moreover, the previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

APPENDIX A

UEAssistanceInformation message

```
-- ASN1START
UEAssistanceInformation-r11 ::=        SEQUENCE {
    criticalExtensions                 CHOICE {
        c1                             CHOICE {
            ueAssistanceInformation-r11    UEAssistanceInformation-
                                           r11-IEs,
            spare7 NULL,
            spare6 NULL, spare5 NULL, spare4 NULL,
            spare3 NULL, spare2 NULL, spare1 NULL
        },
        criticalExtensionsFuture       SEQUENCE { }
    }
}
UEAssistanceInformation-r11-IEs ::=    SEQUENCE {
    powerPrefIndication-r11            Power-              OPTIONAL,
                                       PrefIndication-r11
    measGapIndication-r11              MeasGapIndication-  OPTIONAL
                                       r11
    nonCriticalExtension               SEQUENCE { }        OPTIONAL
}
-- ASN1STOP
```

APPENDIX B

- MeasGapIndication

The IE MeasGapIndication is used to provide information related to the UE measurement gap preference.

MeasGapIndication information element
```
-- ASN1START
MeasGapIndication-r11 ::=    ENUMERATED {AlternateGapsNeeded,
AlternateGapsNotNeeded}
-- ASN1STOP
```
MeasGapIndication field descriptions
MeasGapIndication
The content of this field indicates to the network if non-overlapping and half frequent measurement gaps (i.e. alternate measurement gaps) are needed.

APPENDIX C

- MeasGapIndication

The IE MeasGapIndication is used to provide information related to the UE measurement gap preference.

MeasGapIndication information element
```
-- ASN1START
MeasGapIndication-r11 ::=    ENUMERATED {normal, alternateGaps}
-- ASN1STOP
```

APPENDIX C-continued

MeasGapIndication field descriptions
MeasGapIndication
Value alternateGaps indicates the UE prefers a measurement gap configuration that alternate with reference to the current measurement gap allocation. Otherwise the value is set to normal.

APPENDIX D

- MeasGapIndication
The IE MeasGapIndication is used to provide information as to whether using alternate gap patterns would not degrade measurements.
MeasGapIndication information element
-- ASN1START
MeasGapIndication-r11 ::=      ENUMERATED {normal, alternateGaps}
-- ASN1STOP
MeasGapIndication field descriptions
MeasGapIndication
Value alternateGaps indicates that measurements would not be degraded with half frequent and non-overlapping measurement gaps, i.e. alternate measurement gaps. Otherwise the value is set to normal.

APPENDIX E

UEAssistanceInformation message

```
-- ASN1START
UEAssistanceInformation-r11 ::=        SEQUENCE {
    criticalExtensions                 CHOICE {
        c1                             CHOICE {
            ueAssistanceInformation-r11    UEAssistanceInformation-
                                           r11-IEs,
            spare7 NULL,
            spare6 NULL, spare5 NULL, spare4 NULL,
            spare3 NULL, spare2 NULL, spare1 NULL
        },
        criticalExtensionsFuture       SEQUENCE { }
    }
}
UEAssistanceInformation-r11-IEs ::=    SEQUENCE {
    powerPrefIndication-r11            Power-                OPTIONAL,
                                       PrefIndication-r11
    alternateGapsNeeded-r11            Alternate-            OPTIONAL
                                       GapsNeeded-r11
```

APPENDIX E-continued

UEAssistanceInformation message

```
    nonCriticalExtension    SEQUENCE { }    OPTIONAL
}
-- ASN1STOP
```
AlternateGapsNeeded field descriptions
AlternateGapsNeeded
If this field is present, this indicates that non-overlapping and half frequent measurement gaps (i.e. alternate measurement gaps) are needed.

APPENDIX F

- MeasGapConfig
The IE MeasGapConfig specifies the dual measurement gap configuration and controls setup/release of dual measurement gaps.
MeasGapConfig-r11 information element

```
-- ASN1START
MeasGapConfig-r11 ::=       CHOICE {
    release                 NULL,
    setup                   CHOICE {
                            SEQUENCE {
        gapOffset  gp1a         INTEGER (0..79),
                   carrierFreq1 ARFCN-ValueEUTRA
        gapOffset  gp1b         INTEGER (0..79),
                   carrierFreq2 ARFCN-ValueEUTRA
                            }
                            SEQUENCE {
        gapOffset  gp2a         INTEGER (0..159),
                   carrierFreq1 ARFCN-ValueEUTRA
        gapOffset  gp2b         INTEGER (0..159),
                   carrierFreq2 ARFCN-ValueEUTRA
                            }
                            }
}
-- ASN1STOP
```
MeasGapConfig field descriptions
gapOffset
Value gapOffset of gp0 corresponds to gap offset of Gap Pattern Id "0" with MGRP = 40 ms, gapOffset of gp1 corresponds to gap offset of Gap Pattern Id "1" with MGRP = 80 ms. Value gapOffset of gp1a and gp1b corresponds to gapoffset of Gap Pattern Id '1' with MGRP = 80 ms, gapOffset of gp2a and gp2b corresponds to gap offset of Pattern Id "2" with MGRP = 160 ms. Also used to specify the measurement gap pattern to be applied, as defined in TS 36.133.

APPENDIX G

- MeasConfig
The IE MeasConfig specifies measurements to be performed by the UE, and covers intra-frequency, inter-frequency and inter-RAT mobility as well as configuration of measurement gaps.
MeasConfig information element

```
-- ASN1START
MeasConfig ::=              SEQUENCE {
    -- Measurement objects
    measObjectToRemoveList         MeasObjectToRemoveList
    OPTIONAL, -- Need ON
    measObjectToAddModList         MeasObjectToAddModList
    OPTIONAL, -- Need ON
    -- Reporting configurations
    reportConfigToRemoveList       ReportConfigToRemoveList
    OPTIONAL, -- Need ON
    reportConfigToAddModList       ReportConfigToAddModList
    OPTIONAL, -- Need ON
    -- Measurement identities
    measIdToRemoveList             MeasIdToRemoveList
    OPTIONAL, -- Need ON
    measIdToAddModList             MeasIdToAddModList
    OPTIONAL, -- Need ON
    -- Other parameters
    quantityConfig                 QuantityConfig
    OPTIONAL, -- Need ON
    measGapConfig                  MeasGapConfig
    OPTIONAL, -- Need ON
```

APPENDIX G-continued

```
s-Measure                        RSRP-Range
  OPTIONAL, -- Need ON
preRegistrationInfoHRPD          PreRegistrationInfoHRPD
  OPTIONAL, -- Need OP
speedStatePars       CHOICE {
   release                       NULL,
   setup                         SEQUENCE {
      mobilityStateParameters       MobilityStateParameters,
      timeToTrigger-SF              SpeedStateScaleFactors
   }
}
  OPTIONAL, -- Need ON
measGapConfig-r11                MeasGapConfig-r11   OPTIONAL, -- Need ON
...
}
MeasIdToRemoveList ::=           SEQUENCE (SIZE (1..maxMeasId)) OF MeasId
MeasObjectToRemoveList ::=       SEQUENCE (SIZE (1..maxObjectId)) OF
MeasObjectId
ReportConfigToRemoveList ::=     SEQUENCE (SIZE (1..maxReportConfigId)) OF
ReportConfigId
-- ASN1STOP
```

MeasConfig field descriptions measIdToRemoveList
List of measurement identities to remove.
measObjectToRemoveList
List of measurement objects to remove.
PreRegistrationInfoHRPD
The CDMA2000 HRPD Pre-Registration Information tells the UE if it should pre-register with the CDMA2000 HRPD network and identifies the Pre-registration zone to the UE.
reportConfigToRemoveList
List of measurement reporting configurations to remove.
s-Measure
PCell quality threshold controlling whether or not the UE is required to perform measurements of intra-frequency, inter-frequency and inter-RAT neighbouring cells. Value "0" indicates to disable s-Measure.
timeToTrigger-SF
The timeToTrigger in ReportConfigEUTRA and in ReportConfigInterRAT are multiplied with the scaling factor applicable for the UE's speed state.
measGapConfig
Used to setup and release dual measurement gaps.

APPENDIX H

8.1.2.1 UE measurement capability

If the UE requires measurement gaps to identify and measure inter-frequency and/or inter-RAT cells, in order for the requirements in the following subsections to apply the E-UTRAN must provide single or dual measurement gap patterns with constant gap durations for concurrent monitoring of all frequency layers and RATs.

During the measurement gaps the UE:
  shall not transmit any data on the carrier frequency to which the gap is associated with
  is not expected to tune the receiver on the E-UTRAN serving carrier frequency to which the measurement gap was configured.

In the uplink subframe occurring immediately after the measurement gap,
  the E-UTRAN FDD UE shall not transmit any data
  the E-UTRAN TDD UE shall not transmit any data if the subframe occurring immediately before the measurement gap is a downlink subframe.

Inter-frequency and inter-RAT measurement requirements within this clause rely on the UE being configured with one measurement gap pattern unless the UE has signaled that it is capable of conducting such measurements without gaps. UEs shall only support those measurement gap patterns listed in Table 8.1.2.1-1 that are relevant to its measurement capabilities.

Table 8.1.2.1-1: Gap Pattern Configurations supported by the UE

| Gap Pattern Id | MeasurementGap Length (MGL, ms) | Measurement Gap Repetition Period (MGRP, ms) | Minimum available time for inter-frequency and inter-RAT measurements during 480 ms period (Tinter1, ms) | Measurement Purpose |
|---|---|---|---|---|
| 0 | 6 | 40 | 60 | Inter-Frequency E-UTRAN FDD and |

APPENDIX H-continued

| | | | | |
|---|---|---|---|---|
| 1 | 6 | 80 | 30 | TDD, UTRAN FDD, GERAN, LCR TDD, HRPD, CDMA2000 1x Inter-Frequency E-UTRAN FDD and TDD, UTRAN FDD, GERAN, LCR TDD, HRPD, CDMA2000 1x |
| 2 | 6 | 160 | tbd | Inter-Freauency E-UTRAN FDD and TDD, UTRAN FDD, GERAN, LCR TDD, HRPD, CDMA2000 1x |

NOTE:
When inter-frequency RSTD measurements are configured as a part of the measurement configuration only Gap Pattern 0 can be used. For defining the inter-frequency and inter-RAT requirements $T_{inter1}$ = 30 ms shall be assumed.
A UE that is capable of identifying and measuring inter-frequency and/or inter-RAT cells without gaps shall follow requirements as if Gap Pattern Id #0 had been used and the minimum available time Tinter1 of 60 ms shall be assumed for the corresponding requirements.
The requirements in clause 9 are applicable for a UE performing measurements according to this section.
For a UE supporting a band combination of E-UTRA carrier aggregation with one uplink carrier configuration, if there is a relaxation of receiver sensitivity $\Delta R_{IB, c}$ as defined in TS36.101 due to the CA configuration, the E-UTRAN measurement side conditions of the RSRP, SCH_RP, and PRP levels for the requirements defined in the clause 8 associated with each downlink band shall be increased by the amount $\Delta R_{IB, c}$ defined for the corresponding downlink band.

APPENDIX I

MeasGapConfig information element
```
-- ASN1START
MeasGapConfig ::=           CHOICE {
    release                     NULL,
    setup                       SEQUENCE {
        gapOffset                   CHOICE {
            gp0                         INTEGER (0..39),
            gp1                         INTEGER (0..79),
            gapOffset1                  SEQUENCE {
                gp1a                        INTEGER (0..79),
                carrierFreq1                ARFCN-ValueEUTRA
                gp1b                        INTEGER (0..79),
                carrierFreq2                ARFCN-ValueEUTRA
            }
            gapOffset2                  SEQUENCE {
                gp2a                        INTEGER (0..159),
                carrierFreq1                ARFCN-ValueEUTRA
                gp2b                        INTEGER (0..159),
                carrierFreq2                ARFCN-ValueEUTRA
            }
            ...
        }
    }
}
-- ASN1STOP
```

MeasGapConfig field descriptions
gapOffset
Value gapOffset of gp0 corresponds to gap offset of Gap Pattern Id "0" with MGRP = 40 ms, gapOffset of gp1 corresponds to gap offset of Gap Pattern Id "1" with MGRP = 80 ms. Value gapOffset1 of gp1a and gp1b corresponds to gapoffset of Gap Pattern Id '1' with MGRP = 80 ms, gapOffset2 of gp2a and gp2b corresponds to gap offset of Pattern Id '2' with MGRP = 160 ms. Also used to specify the measurement gap pattern to be applied, as defined in TS 36.133 [16].

APPENDIX J

- MeasPrefIndication
The IE MeasPrefIndication is used to provide information related to the measurement gap patterns preference.

MeasPrefIndication information element
```
-- ASN1START
MeasPrefIndication-r11 ::= SEQUENCE {
    firstGap-Indication     Gap-IndicationList,     OPTIONAL
    secondGap-Indication    Gap-IndicationList      OPTIONAL
}
Gap-IndicationList ::= SEQUENCE {
```

APPENDIX J-continued

```
    SEQUENCE (SIZE (1..maxObjectId)) of Gap-Frequencies
    pattern-Indication      ENUMERATED (no change, more gaps, less gaps}
)
Gap-Frequencies ::= SEQUENCE {
    gap-FrequencyEUTRA      Gap-FrequencyEUTRA,     OPTIONAL
}
Gap-FrequencyEUTRA ::= SEQUENCE {
    carrierFreq             ARFCN-ValueEUTRA
}
-- ASN1STOP
```

MeasPrefIndication field descriptions
Pattern-Indication
Value lessgaps indicates the UE prefers a measurement gap configuration for the associated frequency(ies) with less measurement gaps (e.g. it is assumed that this would not degrade measurements). Value moregaps indicates the UE prefers a measurement gap configuration for the associated frequencies with more measurement gaps..
Otherwise the value is set to no change.

APPENDIX K

UEAssistanceInformation message
```
-- ASN1START
UEAssistanceInformation-r11 ::=     SEQUENCE {
    criticalExtensions                  CHOICE {
        c1                                  CHOICE {
            ueAssistanceInformation-r11         UEAssistanceInformation-r11-IEs,
            spare7 NULL,
            spare6 NULL, spare5 NULL, spare4 NULL,
            spare3 NULL, spare2 NULL, spare1 NULL
        },
        criticalExtensionsFuture            SEQUENCE { }
    }
}
UEAssistanceInformation-r11-IEs ::=  SEQUENCE {
    powerPrefIndication-r11             Power-PrefIndication-r11    OPTIONAL,
    measPrefIndication-r11              Meas-PrefIndication-r11     OPTIONAL,
    nonCriticalExtension                SEQUENCE { }                OPTIONAL
}
-- ASN1STOP
```

APPENDIX L

- MeasPrefIndication

The IE MeasPrefIndication is used to provide information related to the measurement gap patterns preference.

MeasPrefIndication information element

```
-- ASN1START
MeasPrefIndication-r11 ::= SEQUENCE {
    firstGap-Indication    Gap-IndicationList,    OPTIONAL
    secondGap-Indication   Gap-IndicationList     OPTIONAL
}
Gap-IndicationList ::= SEQUENCE {
    -- Measurement identities
    measIdList         MeasIdToAddModList
    pattern-Indication ENUMERATED (no change, more gaps, less
                       gaps}
)
MeasIdToAddModList ::= SEQUENCE (SIZE (1..maxMeasObjectId)) OF
MeasIdToAddMod
MeasIdToAddMod ::=SEQUENCE {
    measObjectId       MeasObjectId,
}
-- ASN1STOP
```

MeasPrefIndication field descriptions

Pattern-Indication
Value lessgaps indicates the UE prefers a measurement gap configuration for the associated serving frequency(ies) with less measurement gaps (e.g. it is assumed that this would not degrade measurements). Value moregaps indicates the UE prefers a measurement gap configuration for the associated frequencies with more measurement gaps.. Otherwise the value is set to no change.

APPENDIX M

8.1.2.1 UE measurement capability

If the UE requires measurement gaps to identify and measure inter-frequency and/or inter-RAT cells, in order for the requirements in the following subsections to apply the E-UTRAN must provide single or dual measurement gap patterns with constant gap durations for concurrent monitoring of all frequency layers and RATs.

During the measurement gaps the UE:
  shall not transmit any data on the carrier frequency to which the gap is associated with
  is not expected to tune the receiver to which the measurement gap was configured on the E-UTRAN serving carrier frequency.

In the uplink subframe occurring immediately after the measurement gap,
  the E-UTRAN FDD UE shall not transmit any data
  the E-UTRAN TDD UE shall not transmit any data if the subframe occurring immediately before the measurement gap is a downlink subframe.

Inter-frequency and inter-RAT measurement requirements within this clause rely on the UE being configured with one measurement gap pattern unless the UE has signaled that it is capable of conducting such measurements without gaps. UEs shall only support those measurement gap patterns listed in Table 8.1.2.1-1 that are relevant to its measurement capabilities.

Table 8.1.2.1-1: Gap Pattern Configurations supported by the UE

| Gap Pattern Id | MeasurementGap Length (MGL, ms) | Measurement Gap Repetition Period (MGRP, ms) | Minimum available time for inter-frequency and inter-RAT measurements during 480 ms period (Tinter1, ms) | Measurement Purpose |
| --- | --- | --- | --- | --- |
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |
| 2 | 6 | 20 | tbd | Inter-Freauency E-UTRAN FDD and TDD, UTRAN FDD, GERAN, LCR TDD, HRPD, CDMA2000 1x |
| 3 | 6 | 160 | tbd | Inter-Frequency E-UTRAN FDD and TDD, UTRAN FDD. GERAN. |

APPENDIX M-continued

LCR TDD, HRPD, CDMA2000 1x

NOTE:
When inter-frequency RSTD measurements are configured as a part of the measurement configuration only Gap Pattern 0 can be used. For defining the inter-frequency and inter-RAT requirements $T_{inter1}$ = 30 ms shall be assumed.
A UE that is capable of identifying and measuring inter-frequency and/or inter-RAT cells without gaps shall follow requirements as if Gap Pattern Id #0 had been used and the minimum available time Tinter1 of 60 ms shall be assumed for the corresponding requirements.
The requirements in clause 9 are applicable for a UE performing measurements according to this section.
For a UE supporting a band combination of E-UTRA carrier aggregation with one uplink carrier configuration, if there is a relaxation of receiver sensitivity $\Delta R_{IB, c}$ as defined in TS36.101 due to the CA configuration, the E-UTRAN measurement side conditions of the RSRP, SCH_RP, and PRP levels for the requirements defined in the clause 8 associated with each downlink band shall be increased by the amount $\Delta R_{IB, c}$ defined for the corresponding downlink band.

APPENDIX N

- MeasGapConfig
The IE MeasGapConfig specifies the measurement gap configuration and controls setup/release of measurement gaps.

MeasGapConfig information element

```
-- ASN1START
MeasGapConfig ::=          CHOICE {
   release                    NULL,
   setup                      SEQUENCE {
      gapOffset                  CHOICE {
         gp0                        INTEGER (0..39),
         gp1                        INTEGER (0..79),
         SEQUENCE {
            CHOICE { -- first gap indication
               gp0                        INTEGER (0..39),
               gp1                        INTEGER (0..79),
               gp2                        INTEGER (0..19),
               gp3                        INTEGER (0..159),
            }
            CHOICE { -- second gap indication
               gp0                        INTEGER (0..39),
               gp1                        INTEGER (0..79),
               gp2                        INTEGER (0..19),
               gp3                        INTEGER (0..159),
            }
         }
         ...
      }
   }
}
-- ASN1STOP
```

MeasGapConfig field descriptions
gapOffset
Value gapOffset of gp0 corresponds to gap offset of Gap Pattern Id "0" with MGRP = 40 ms, gapOffset of gp1 corresponds to gap offset of Gap Pattern Id "1" with MGRP = 80 ms, gapOffset of gp2 corresponds to gap offset of Gap Pattern Id "2" with MGRP = 20 ms, gapOffset of gp3 corresponds to gap offset of Gap Pattern Id "3" with MGRP = 160 ms. Also used to specify the measurement gap pattern to be applied, as defined in TS 36.133.

The invention claimed is:

1. A method at a user equipment (UE) capable of operating in a carrier aggregation environment using at least first and second component carriers, the method comprising:
sending a measurement gap preference to a network, the gap preference indicating a preference for a measurement gap configuration for the first component carrier of the UE, the measurement gap preference comprising at least one of gap repetition period, gap length, and gap offset, and wherein the measurement gap configuration is different than a second measurement gap configuration for the second component carrier;
receiving at the UE a measurement gap allocation from the network, the allocation indicating a first measurement gap configuration for the first component carrier of the UE, the first measurement gap configuration being different than the second measurement gap configuration for the second component carrier of the UE; and
implementing the first measurement gap configuration for the first component carrier and the second measurement gap configuration for the second component carrier simultaneously at the UE.

2. The method of claim 1 wherein the first measurement gap configuration differs from the second measurement gap configuration in at least one of: a gap repetition period, a gap length, or a gap offset.

3. The method of claim 1 wherein the preference is for at least one of a specific gap repetition period or a specific gap length for the first component carrier.

4. The method of claim 1 wherein the preference is for a specific gap configuration for the first component carrier.

5. A user equipment (UE) capable of operating in a carrier aggregation environment using at least first and second component carriers, the user equipment comprising:
a processor; and
a communications subsystem,
wherein the user equipment is configured to:
send a measurement gap preference to a network, the gap preference indicating a preference for a measurement gap configuration for the first component carrier of the UE, the measurement gap preference comprising at least one of gap repetition period, gap length, and gap offset, and wherein the measurement gap configuration is different than a second measurement gap configuration for the second component carrier;
receive at the UE a measurement gap allocation from the network, the allocation indicating a first measurement gap configuration for the first component carrier of the UE, the first measurement gap configuration being different than the second measurement gap configuration for the second component carrier of the UE; and
implement the first measurement gap configuration for the first component carrier and the second measurement gap configuration for the second component carrier simultaneously.

6. The user equipment of claim 5 wherein the first measurement gap configuration differs from the second measurement gap configuration in at least one of: a gap repetition period, a gap length, or a gap offset.

7. The user equipment of claim 5 wherein the preference is for at least one of a specific gap repetition period or a specific gap length for the first component carrier.

8. The user equipment of claim 5 wherein the preference is for a specific gap configuration for the first component carrier.

9. A method at a network element, comprising:
receiving a measurement gap preference from a user equipment (UE), the gap preference indicating a preference for a measurement gap configuration for at least one component carrier of the UE, the measurement gap preference comprising at least one of gap repetition period, gap length, and gap offset;

allocating a measurement gap configuration for the UE capable of operating in a carrier aggregation environment using at least first and second component carriers; and sending the measurement gap allocation to the UE, the allocation indicating a first measurement gap configuration for the first component carrier, the first measurement gap configuration being different than a second measurement gap configuration allocated for the second component carriers;

wherein at least part of the first measurement gap configuration is indicated relative to a previous gap configuration for the first component carrier, the relative indication being for at least one of: a longer gap repetition period, a shorter gap repetition period, a longer gap length, a shorter gap length, a larger gap offset, or a smaller gap offset.

10. The method of claim 9 wherein the first measurement gap configuration differs from the second measurement gap configuration in at least one of a gap repetition period, a gap length, or a gap offset.

11. The method of claim 9 wherein at least part of the first measurement gap configuration is indicated relative to a default gap configuration for the first component carrier.

12. The method of claim 11 wherein the relative indication is for at least one of a longer gap repetition period, a shorter gap repetition period, a longer gap length, a shorter gap length, a larger gap offset, or a smaller gap offset.

13. A network element comprising:
a processor; and
a communications subsystem,
wherein the network element is configured to:
receive a measurement gap preference from a user equipment (UE), the gap preference indicating a preference for a measurement gap configuration for at least one component carrier of the UE, the measurement gap preference comprising at least one of gap repetition period, gap length, and gap offset;

allocate a measurement gap configuration for the UE capable of operating in a carrier aggregation environment using at least first and second component carriers; and send the measurement gap allocation to the UE, the allocation indicating a first measurement gap configuration for the first component carrier, the first measurement gap configuration being different than a second measurement gap configuration allocated for the second component carrier;

wherein at least part of the first measurement gap configuration is indicated relative to a previous gap configuration for the first component carrier, the relative indication being for at least one of a longer gap repetition period, a shorter gap repetition period, a longer gap length, a shorter gap length, a larger gap offset, or a smaller gap offset.

14. The network element of claim 13 wherein the first measurement gap configuration differs from the second measurement gap configuration in at least one of: a gap repetition period, a gap length, or a gap offset.

15. The network element of claim 13 wherein at least part of the first measurement gap configuration is indicated relative to a default gap configuration for the first component carrier.

16. The network element of claim 15 wherein the relative indication is for at least one of: a longer gap repetition period, a shorter gap repetition period, a longer gap length, a shorter gap length, a larger gap offset, or a smaller gap offset.

* * * * *

UNITED STATES PATENT AND TRADEMARK OFFICE
CERTIFICATE OF CORRECTION

PATENT NO.         : 9,515,771 B2                                    Page 1 of 1
APPLICATION NO.    : 14/271718
DATED              : December 6, 2016
INVENTOR(S)        : Satish Venkob et al.

It is certified that error appears in the above-identified patent and that said Letters Patent is hereby corrected as shown below:

On the Title Page

First Page, Column 1, please insert --Foreign Application Data - PCT/IB2013/001249 May 15, 2013--.

In the Claims

Column 41, Line 12, In Claim 9, please delete "carriers" and insert --carrier--.

Column 41, Line 22, In Claim 10, please insert a --:-- between the words "of" and "a gap".

Column 41, Line 28, In Claim 12, please insert a --:-- between the words "of" and "a longer gap".

Column 42, Line 18, In Claim 13, please insert a --:-- between the words "of" and "a longer gap".

Signed and Sealed this
Twenty-eighth Day of February, 2017

Michelle K. Lee
*Director of the United States Patent and Trademark Office*